US007676583B2

(12) United States Patent
Eaton et al.

(10) Patent No.: US 7,676,583 B2
(45) Date of Patent: *Mar. 9, 2010

(54) SYSTEM FOR PROVIDING CONTINUITY BETWEEN SESSION CLIENTS AND METHOD THEREFOR

(75) Inventors: Eric Thomas Eaton, Lake Worth, FL (US); Von Alan Mock, Boynton Beach, FL (US); David Jeffery Hayes, Boynton Beach, FL (US)

(73) Assignee: Motorola, Inc., Schaumburg, IL (US)

( * ) Notice: Subject to any disclaimer, the term of this patent is extended or adjusted under 35 U.S.C. 154(b) by 82 days.

This patent is subject to a terminal disclaimer.

(21) Appl. No.: 11/429,681

(22) Filed: May 8, 2006

(65) Prior Publication Data

US 2006/0212585 A1 Sep. 21, 2006

Related U.S. Application Data

(63) Continuation of application No. 10/072,672, filed on Feb. 8, 2002, now abandoned.

(51) Int. Cl.
*G06F 15/16* (2006.01)

(52) U.S. Cl. ........................ 709/227; 442/436; 442/439; 442/442

(58) Field of Classification Search ................. 709/226, 709/227, 223, 242, 231, 206; 370/329, 236, 370/230; 725/86; 701/201; 340/825.22; 455/432.2, 519, 414.4
See application file for complete search history.

(56) References Cited

U.S. PATENT DOCUMENTS 4,811,337 A 3/1989 Krolopp et al.
5,508,695 A 4/1996 Nelson et al.
5,517,618 A * 5/1996 Wada et al. ................. 709/223
5,535,436 A 7/1996 Yoshida et al.

(Continued)

FOREIGN PATENT DOCUMENTS

EP 0847178 A2 6/1998

(Continued)

OTHER PUBLICATIONS

H. Mizuno, et al., "A Multimedia Groupware System Integrating DTC with VOD and WWW", IPSJ SIG Notes 96-GW-18, Jun. 14, 1996, pp. 49-54, published by Information Processing Society of Japan.

(Continued)

*Primary Examiner*—Dustin Nguyen
(74) *Attorney, Agent, or Firm*—Sylvia Chen; Daniel C. Crilly

(57) ABSTRACT

An online communication system (10) includes a plurality of remote session clients (12) and one or more online servers (14). The online communication system (10) provides continuity of an online session (80) between a server (14) and one of the remote session clients (12). A first session client (18) participates in the online session (80), including receiving and accumulating a plurality of session information (182) for the online session (80). The first session client (18) initiates a transfer of the session information (182) to a second session client (20) to enable the second session client (20) to seamlessly continue the online session (80) in place of the first session client (18) after the transfer of the session information (182).

19 Claims, 17 Drawing Sheets

U.S. PATENT DOCUMENTS

| | | | | |
|---|---|---|---|---|
| 5,555,446 | A | 9/1996 | Jasinski | |
| 5,793,365 | A | 8/1998 | Tang et al. | |
| 5,793,635 | A | 8/1998 | Niwa | |
| 5,862,330 | A | 1/1999 | Anupam et al. | |
| 5,948,040 | A * | 9/1999 | DeLorme et al. | 701/201 |
| 5,956,626 | A | 9/1999 | Kaschke et al. | |
| 5,966,651 | A | 10/1999 | Sibecas | |
| 5,974,447 | A | 10/1999 | Cannon et al. | |
| 5,991,796 | A | 11/1999 | Anupam et al. | |
| 6,038,296 | A | 3/2000 | Brunson et al. | |
| 6,040,781 | A * | 3/2000 | Murray | 340/825.22 |
| 6,041,229 | A | 3/2000 | Turner | |
| 6,065,062 | A * | 5/2000 | Periasamy et al. | 709/242 |
| 6,101,531 | A | 8/2000 | Eggleston et al. | |
| 6,189,098 | B1 | 2/2001 | Kaliski, Jr. | |
| 6,201,962 | B1 * | 3/2001 | Sturniolo et al. | 455/432.2 |
| 6,240,444 | B1 | 5/2001 | Fin et al. | |
| 6,349,337 | B1 * | 2/2002 | Parsons et al. | 709/227 |
| 6,377,996 | B1 | 4/2002 | Lumelsky et al. | |
| 6,601,101 | B1 * | 7/2003 | Lee et al. | 709/227 |
| 6,668,276 | B1 | 12/2003 | Ohkado et al. | |
| 6,788,949 | B1 * | 9/2004 | Bansal | 455/519 |
| 6,807,150 | B1 * | 10/2004 | McNiff et al. | 370/230 |
| 6,826,154 | B2 * | 11/2004 | Subbiah et al. | 370/236 |
| 6,950,852 | B1 | 9/2005 | Kobayaghi et al. | |
| 7,050,793 | B1 * | 5/2006 | Kenward et al. | 455/414.4 |
| 7,225,260 | B2 * | 5/2007 | Herrod | 709/227 |
| 2001/0032139 | A1 | 10/2001 | Debonnett, Jr. | |
| 2002/0055788 | A1 | 5/2002 | Petrie et al. | |
| 2002/0059425 | A1 * | 5/2002 | Belfiore et al. | 709/226 |
| 2002/0107973 | A1 * | 8/2002 | Lennon et al. | 709/231 |
| 2002/0198051 | A1 | 12/2002 | Lobel et al. | |
| 2003/0055662 | A1 | 3/2003 | Collins | |
| 2003/0055977 | A1 * | 3/2003 | Miller | 709/227 |
| 2003/0086390 | A1 * | 5/2003 | Eschbach et al. | 370/329 |
| 2003/0126213 | A1 * | 7/2003 | Betzler | 709/206 |
| 2005/0033843 | A1 * | 2/2005 | Shahi et al. | 709/226 |
| 2005/0034161 | A1 * | 2/2005 | Brown | 725/86 |

FOREIGN PATENT DOCUMENTS

| | | | |
|---|---|---|---|
| JP | 10334051 | | 12/1998 |
| JP | 2000215173 | A | 8/2000 |
| JP | 2001051932 | A | 2/2001 |
| WO | 200157625 | A | 8/2001 |
| WO | 200195118 | A | 12/2001 |

OTHER PUBLICATIONS

Supplementary European Search Report dated Sep. 3, 2007, European Patent Office, pp. 1-3.

Advisory Action Before the Filing of an Appeal Brief for U.S. Appl. No. 10/072,672 dated May 1, 2006 (2 page).

Amendment and Response for U.S. Appl. No. 10/072,672 dated Mar. 30, 2006 (50 pages).

Final Office Action for U.S. Appl. No. 10/072,672 dated Dec. 7, 2005 (17 pages).

Amendment and Response for U.S. Appl. No. 10/072,672 dated Oct. 6, 2005 (50 pages).

Office Action for U.S. Appl. No. 10/072,672 dated Jul. 12, 2005 (28 pages).

Preliminary Amendment for U.S. Appl. No. 10/072,672 dated Aug. 6, 2004 (20 pages).

Hiromi Mizuno et al, "A Multimedia Groupware System Integrating DTC with VOD and WWW", Information Processing Society of Japan (IPSJ) SIG Notes 96-GW-18, Jun. 14, 1996, pp. 49-54.

Japan Patent Office, "Office Action for Japanese Patent Application 2003-566719", Mar. 6, 2007, 6 pages.

Japan Patent Office, "Decision of Refusal for Japanese Patent Application 2003-566719", Jul. 3, 2007, 2 pages.

European Patent Office, "Supplementary European Search Report for EP Patent Application 03705992.0", Sep. 3, 2007, 2 pages.

* cited by examiner

SYSTEM FOR PROVIDING CONTINUITY BETWEEN SESSION CLIENTS AND METHOD THEREFOR

CROSS-REFERENCE TO RELATED APPLICATIONS

This application is a continuation of U.S. application Ser. No. 10/072,672, filed on Feb. 8, 2002 now abandoned, which is entitled "System for Providing Continuity Between Session Clients and Method Therefor," is assigned to the assignee of the present application, and is incorporated herein by this reference, and claims priority upon such application under 35 U.S.C. § 120.

BACKGROUND OF THE INVENTION

1. Field of the Invention

This invention relates in general to communication systems and in particular to communication systems incorporating capabilities to provide continuity of real time action information among a plurality of session clients.

2. Description of the Related Art

An auction is the buying and selling of property through open public bidding. Typically, potential purchasers make a succession of increasing bids or offers until the auctioneer accepts the highest (and final) bid. At a Dutch auction, by contrast, the seller offers property at successively lower prices until one of his offers is accepted or until the price drops so low as to force the withdrawal of the offered property. Prospective buyers are usually allowed to examine auction items beforehand, and sellers can set a minimum price below which the property will not be sold. Auctions are important in the agricultural markets of many countries, permitting the rapid sale of perishable goods. Other items often sold at auction include artwork and antiques, secondhand goods, and farms and buildings repossessed by banks or the government. Auction selling is also employed on stock and commodity exchanges.

Historically, potential buyers meet at a geographical location to participate in an auction. This method tends to limit the number of potential buyers to the available population that are physically near the geographical location of the auction. Potential buyers make the conscious decision to attend an auction after receiving advertisement by word of mouth or via various media channels such as the newspaper. Potential buyers show up prior to the auction start time and inspect potential items to bid on. As the auction starts, one item at a time is auctioned off through a person called the auctioneer. The auction usually lasts for a brief part of the day with the financial transactions between each buyer and seller being resolved before the end of the auction. Usually the auctioneer or auction house will generate revenue by receiving a percentage of the item sold or alternatively can have a flat rate for each item sold. An auction that requires physical presence at a geographical location has limits on the number of items that can be sold within an allotted time period, the number of people present in a geographical auction location, and the effects on the auction price.

Recently, the ubiquitous nature of the Internet has fueled the growth of online electronic auctions. Now a larger number of buyers can be reached as they enjoy bidding for an item in the comfort of their home or other surroundings without physically being at the geographical location of the auction. Benefits of the online auction include alleviation of the requirement to be physically at a geographical location, the potential for reaching a larger number of people through the ubiquitous nature of the Internet, capability for many items to be auctioned off at the same time, capability for the auction time to continue for several days. However, at the same time online auctions enjoy these benefits, drawbacks include lack of mutual trust between seller and buyer, need to visualize the product description and shape, and reduction of participation due to limited access to the Internet at a buyer's current location.

Online auction houses provide their services through online servers including database storage of buyer and seller profiles and auction items. The auction house provides services that allow the user to search by a particular interest, receive notification of available items of particular interest, rate or provide a trust level for buyer and seller, provide a seller with a virtual store front, maintain an overview page of items created by a buyer, receive notification in price changes for buyer and seller, create escrow account to exchange money and merchandise. Online auction houses generate revenue for operation by charging a fee based upon the percentage of the sales price, providing other services such as escrow accounts, and through selling online advertisements.

Online auction houses allow the buyer to browse items for sale by utilizing a search engine that locates particular items of interest. A buyer will usually set up a profile that is accessible by username and password and contains such items as auction interests. Notifications by electronic mail can be sent to the perspective buyer once a seller has listed an item that matches the buyer's interest. The auction house provides as part of the buyer's profile a personal storable listing that includes items they are currently bidding on, items they are following, and items they have won. The buyer can add to the list from auction items they are interested in or want to bid on.

The online auction house gives the capability to the seller to create a virtual storefront or to list items independently. The seller, like the buyer, creates a user account by supplying a username and password and contact information. The seller has the ability to create a unique motif for their virtual storefront. The seller will normally provide a description along with a picture of the item to sell and possibly a hyperlink to the manufacturer of the item that can be used to provide relative cost comparison. In addition, the seller can leave contact information so that the perspective buyer can have a dialogue with the seller. The seller, in some cases, can desire to have a minimum reserved price for an item or service. The minimum sale price is usually not made public while bidding on an item, but will be indicated in the listing information when the minimum reserved price has been reached. The seller has the ability to list all of his items within one listing of his virtual storefront.

The online auction house helps foster a sense of mutual trust by providing rating methods for both buyers and sellers. Buyer and seller ratings include such items as the number of transactions performed, the measure of performance or satisfaction, and the history information. Either a perspective buyer or a seller can enter these ratings. Based upon past performance or execution, a buyer or seller can begin to realize a feeling of trust without ever meeting the person they are selling to or buying from. In addition, the online auction house will provide escrow services to the buyer and/or seller. The auction house will typically hold the form of payment, until the buyer receives the item or service. Buyers and sellers with limited history or poor performance typically use the escrow service. One of the many benefits of having a superior seller's rating is that the seller can create brand or seller loyalty based on past auction. As with other financial business transactions there are some bidders that have either fraudulent behaviors or dislikes toward a certain seller. A seller can utilize the blacklist service to deny a potential fraudulent or unhappy buyer from participating in any of the seller's online auctions.

A seller who places an item up for auction will also include the duration of the auction. Typically, the activity on an auction will start out slow with the activity reaching the apex at the very end of the auction. A desiring bidder will soon realize that they must have online bidding presence toward the end of the auction. The bidder for an item up for auction has the option to either manually participate in the bidding process or to utilize the online auction house's automated bidding mechanism. The manual process is usually the preferred method where the bidder will follow the online bidding history and update their bid as needed to retain the highest bid price up to the highest price the bidder is willing to offer. As the close of the auction nears, the bidder will actively compete with other buyers to retain the highest bid price. As a compliment to the manual bid process, the online auction house typically provides an automated bidding agent that acts on the behalf of the buyer whether are not they are physically connected to the online auction. The buyer will select the item to bid and enter their starting bid price along with a maximum bid price that they are willing to pay for that item or service. The buyer's maximum bid price is not visible to other users within the online auction house. The agent, unlike the buyer, always knows the minimum reserved price, if any, set by the seller and will increment the bid price to the minimum reserved price if this price is within the buyer's maximum bid price. As part of the buyer's bidding process, notification of events relating to the auction item(s) are sent to the buyer typically through electronic mail. The types of events in which the buyer will be notified by the online auction house include no longer being the highest bidder, the end of auction results (winning bid), and the remaining time on auction.

Without the aid of an online agent, a buyer will receive the auction item or service if he/she is the highest bidder and has an active presence toward the end of the auction. Unfortunately, the expiration time of the auction does not always coincide with the buyer's schedule of daily activities. The buyer can have to leave an online auction to perform other daily duties and as result can miss the competitive bidding at the end of the auction.

Gambling is the act of a person wagering against an opposing person(s) as to the outcome of an event. Many people enjoy the traditional forms of gambling such as boxing, horse and dog racing, and sporting events such as football, basketball, soccer, baseball and hockey. These types of gambling events are not usually paused or suspended to be completed at a later time and are referred to as real time gambling events. Types of gambling events that can be suspended or delayed to a later time are card games and slot machines.

Traditionally, a bet or a wager is placed with a bookkeeper on the outcome of an event. The bookkeeper will generate revenue by charging a percentage of proceeds earned by a gambling participant. In addition, the bookkeeper will track the wagers placed by the participants and the progress of the gambling event itself. Usually the bookkeeper will vary the odds of the event as to balance or bring equality to the gambling event. For example, a soccer team can be given two goals to their final score, since the opposing soccer team is viewed to be better than them by two goals.

During a gambling event, odds for the outcome can change to reflect a new equality between participants, therefore, gambling participants will benefit by being able to receive and act upon the new odds in real time. In addition, late breaking news prior and during a gambling event can change the outcome of the gambling event, thereby creating a need for the gambling participant to be able to receive and act upon this information. Likewise, the history surrounding a gambling event can be beneficial to a participant that is able to receive and act upon this information in real time.

Technological advances in the Internet now provide the capability for online gambling to utilize an Internet server to perform the roll of bookkeeper. Some of the advantages of online gambling are providing for online gamblers to view the latest changes in odds, easier tracking of monies won/lost, social/language barriers are easier to overcome while providing a safe surrounding environment, gambling participants can learn through free practice sessions at their own speed, and electronic commerce easies collection problems. Some potential disadvantages in the technology advancements of online gambling are the potential for anonymous money laundering, the complexity of distribution of winnings, the increased risk of children gaining access to gambling sites, and the increased risk of a gambler becoming engrossed in the gambling event.

Online sessions such as online auctions and online gambling include data that is time and action sensitive, having little or no value after the auction or gambling time has expired. Further, online sessions can continue for several days. Although the online session participant benefits from staying informed and involved, it is difficult to remain available to the fixed session client monitoring the online session.

Recently, to meet the needs of session participants who cannot remain at a fixed location and/or device having a session client, online services are providing wireless access to their services and associated Internet sites using Internet enabled wireless devices, such as cellular telephones and pagers. The Internet enabled cellular telephone, for example, can include a session client with the same functionality as a session client within a fixed device, such as a personal computer. Similarly, a pager can receive alerts relating to the status of a particular online session. One drawback of real time actionable events experienced in online auctions and gambling is that the times of the events do not always coincide with the user's preferred method of online participation.

With today's technology, when participating in an online session, in order to switch to a different session client, the account user disconnects the currently connected session client from the online server. The account user then later, at the appropriate event time, connects a second session client to the online server and logs in. Finally, the account user reinitiates each online session that was in progress on the first session client. The disadvantage of this method is the numerous manual operations required of the account user to change session clients including remembering the appropriate event time to start the new session client.

Therefore, what is needed is a system and method for the transferring of real time event information associated with one or more online sessions between different session clients allowing the seamless continuation of participation in the online sessions.

BRIEF DESCRIPTION OF THE DRAWINGS

The present invention will be described by way of exemplary embodiments, but not limitations, illustrated in the accompanying drawings in which like references denote similar elements.

DETAILED DESCRIPTION OF THE PREFERRED EMBODIMENT(S)

As required, detailed embodiments of the present invention are disclosed herein; however, it is to be understood that the disclosed embodiments are merely exemplary of the invention, which can be embodied in various forms. Therefore specific structural and functional details disclosed herein are not to be interpreted as limiting, but rather should be interpreted merely as a basis for the claims and as a representative basis for teaching one skilled in the art to variously employ the present invention in virtually any appropriately detailed structure. Further, the terms and phrases used herein are not intended to be limiting; but rather are intended to provide an understandable description of the invention.

Figure 1:
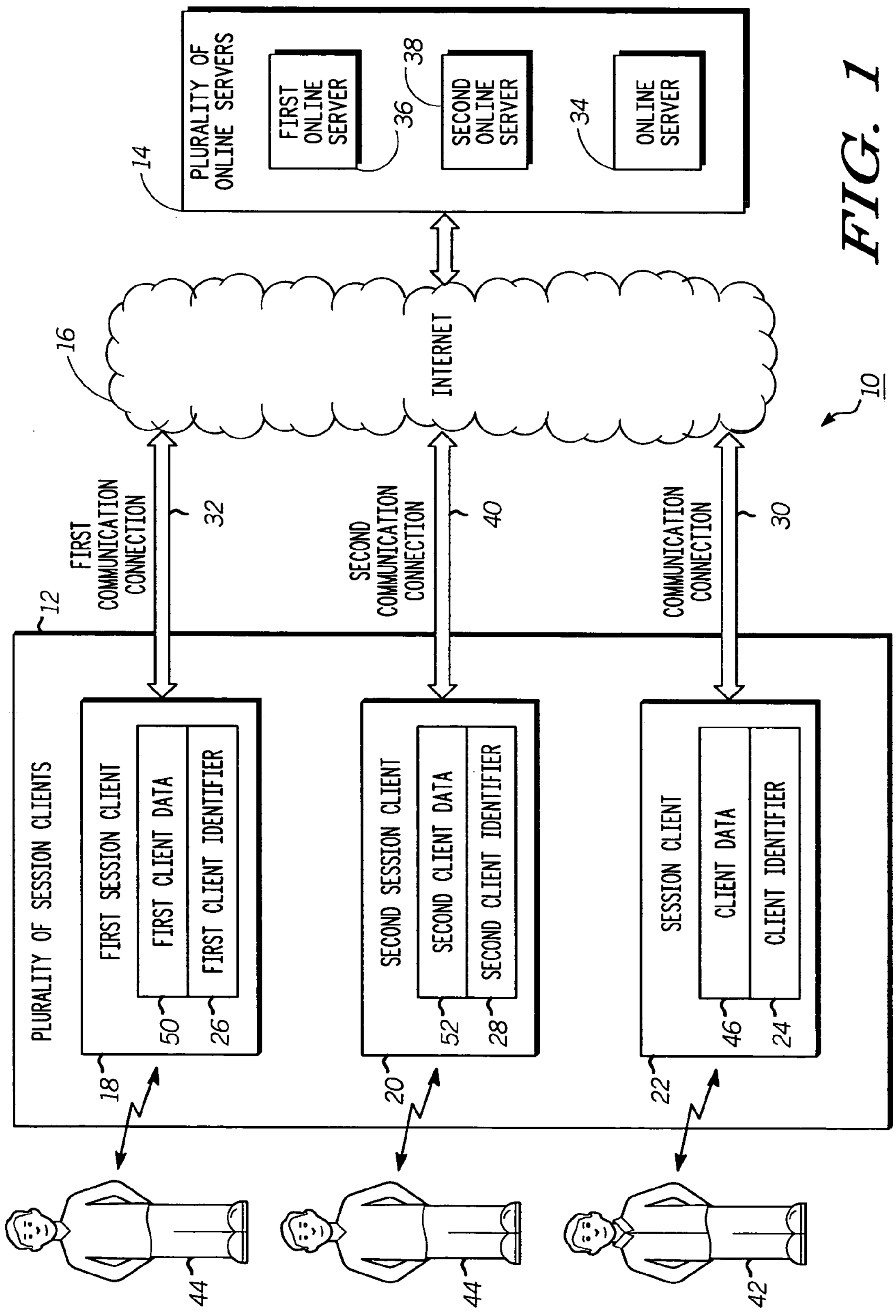
FIG. 1 is an electronic block diagram of an online communication system, in accordance with an embodiment of the present invention.

Referring to FIG. 1, an electronic block diagram of an online communication system 10 in accordance with the present invention is shown. As illustrated, the online communication system 10 preferably includes a plurality of session clients 12 for communication with a plurality of online servers 14, wherein the session clients 12 and the online servers 14 are preferably interconnected through the well-known worldwide Internet computer network 16. Each of the plurality of session clients 12, such as a first session client 18 and a second session client 20, includes client software to interface within the online communication system 10. Each of the plurality of session clients 12 can be a client residing on a user's session device, such as a personal computer, a Cable set top box, an xDSL home gateway, a satellite gateway, a wireless gateway, or an equivalent. It will be appreciated by one of ordinary skill in the art that in accordance with the present invention, the interface capabilities of the client software can also be designed into client hardware of a session client.

Each session client 22 of the plurality of session clients 12 further includes a client identifier 24. For example, the first session client 18 includes a first client identifier 26 and the second session client 20 includes a second client identifier 28. The client identifier 24 of the session client 22 is a unique identification within the online communication system 10 for directing information and data to a particular session client within a session device. For example, the client identifier 24 can be an address of a mobile device or an IP address and number of the port of a fixed network device.

To communicate with at least one of the plurality of online servers 14, the session client 22 establishes a communication connection 30. For example, the first session client 18 establishes a first communication connection 32 via the Internet computer network 16 for communication with at least one online server 34 of the plurality of online servers 14, such as the first online server 36 and/or the second online server 38. Similarly, the second session client 20 establishes a second communication connection 40 for communication with at least one of the plurality of online servers 14. It will be appreciated by one of ordinary skill in the art that the communication connection 30, the first communication connection 32, and the second communication connection 40 can be a physical connection, or alternatively can be a logical connection where the act of connecting and disconnecting is a logical one. Further, each communication connection 30 can be a broadband connection, such as Digital Subscriber Line (DSL) or cable television, or a narrowband connection, such as an analog modem.

Each session client 22 of the plurality of session clients 12 is operated by at least one account user 42. The account user 42 is an individual who uses one or more session clients to communicate with the plurality of online servers 14 along with other account users. It will be appreciated by one of ordinary skill in the art that the account user 42 can communicate using one or more session clients. For example, a first account user 44 can establish communication with the plurality of online servers 14 using the first session client 18, and, in accordance with the present invention, also using the second session client 20.

Figure 9:
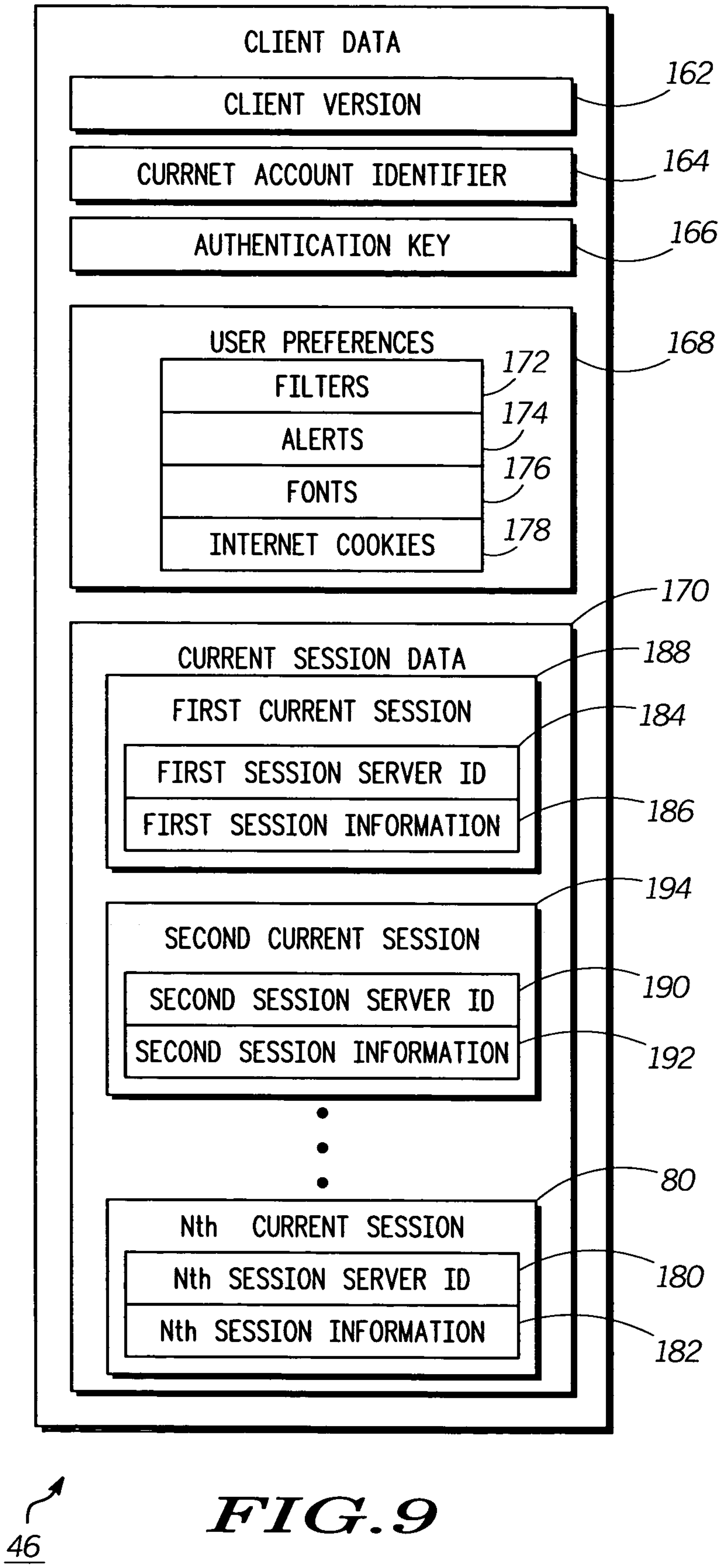
FIG. 9 illustrates client data for use within the session client of FIG. 8.

Each session client 22 preferably includes a plurality of client data 46. The client data 46 includes data associated with the session client 22 and data associated with each online session within which the session client 22 is currently participating, has participated in, or plans to participate in with one or more of the plurality of online servers 14. The client data 46 can be divided up into one or more client data portions 48 as illustrated in FIG. 9. The first session client 18 includes a first client data 50 and the second session client 20 includes a second client data 52.

Figure 2:
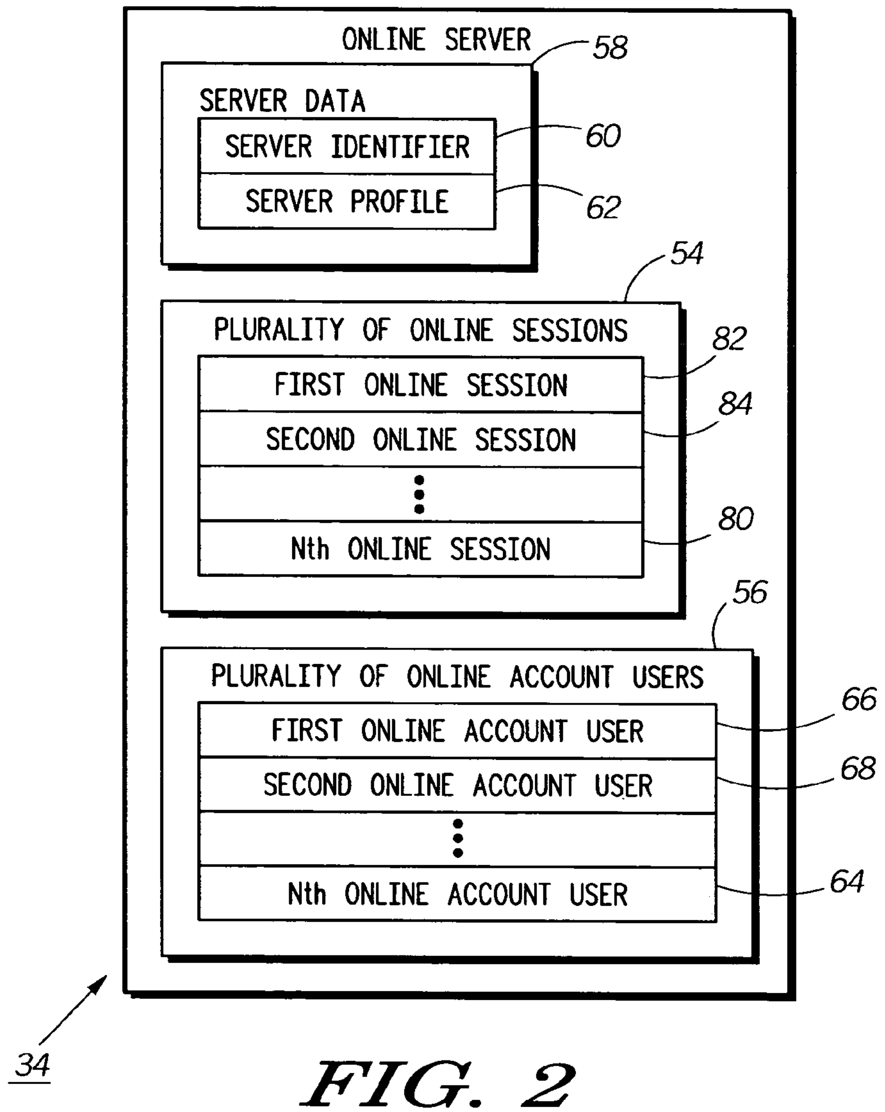
FIG. 2 illustrates an online server for use within the online communication system of FIG. 1.

FIG. 2 illustrates the online server 34 for use within the online communication system 10 of FIG. 1, in accordance with the preferred embodiment of the present invention. It will be appreciated by one of ordinary skill in the art that the online server 34 as illustrated in FIG. 2 can be any of the plurality of online servers 14 of FIG. 1 such as the first online server 36 and the second online server 38. The online server 34 manages a plurality of online sessions 54 among the plurality of session clients 12, facilitating substantially real time session participation among the plurality of session clients 12 within the online communication system 10 of FIG. 1. The plurality of online sessions 54, for example, can be an online auction session, an online gambling session, or any equivalent action sensitive online session. The online server 34 provides numerous services to manage the plurality of online sessions 54. The online server 34 also offers various options to the plurality of online account users 56 to reduce cost or enhance the features of the plurality of online sessions 54.

The online server 34 includes server data 58. The server data 58 preferably includes a server identifier 60 for the online server 34. The server identifier 60 can be, for example, a unique selective call address in a wireless communication system. Alternatively, the server identifier 60 can be an IP address, or an IP address and associated number of the port assigned to the online server 34 of a wired communication system. It will be appreciated by one of ordinary skill in the art that the server identifier 60 can be one mentioned herein or an equivalent. The server identifier 60 enables the communication between the plurality of session clients 12 and the online server 34 using the communication connections, such as the communication connection 30, the first communication connection 32, and the second communication connection 40 of FIG. 1. The server data 58 also preferably includes a server profile 62. The server profile 62 includes information regarding the capabilities of the online server 34. For example, the server profile 62 can include server processing power, server client capability, server session capability, and server access to secondary networks. It will be appreciated by one of ordinary skill in the art that the server profile 62 can include any of those mentioned above in any combination or an equivalent.

Figure 3:
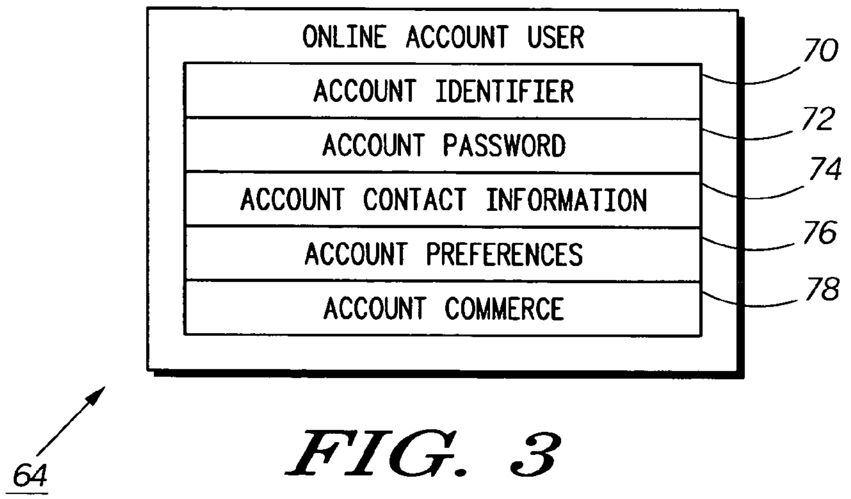
FIG. 3 illustrates an online account user for use within the online server of FIG. 2.

FIG. 3 illustrates data stored in the online server 34 of FIG. 2 for an online account user 64, in accordance with the preferred embodiment of the present invention. The online account user 64, for example, can be a first online account user 66 and/or a second online account user 68 as illustrated in FIG. 2. Further, the online account user 64 can be the account user 42 and/or the first account user 44 of FIG. 1. For example, as illustrated, the online server 34 stores an account identifier 70, an account password 72, account contact information 74, account preferences 76, and account commerce 78. The account identifier 70 is preferably a user name or other identification of the online account user 64. The account password 72 is preferably a codeword or an authentication key 166 created and/or known only by the online account user 64 to provide security for access of account information and online session participation. For example, once the online account user 64 is logged into the online server 34, the online account user 64 would be required to input the account password 72 for each financial transaction and setting change. The account contact information 74, for example, can include account user presence, account user availability, account phone number, account mailing address, or account user preferred communication means. It will be appreciated by one of ordinary skill in the art that the account contact information 74 can be any of the contact information mentioned herein or an equivalent.

The account preferences 76 can for example include favorite topics, associates, group lists, age, obscenity rating, and optional services. The account preferences 76 further can include text font attributes, filter settings, blocking settings, screen names per account identifier, alert settings per screen name, buddy list groups, electronic mailboxes, electronic voice mail, and parental control settings. It will be appreciated by one of ordinary skill in the art that the account preferences 76, in accordance with the present invention, can include any of those preferences mentioned herein or an equivalent.

The account commerce 78 can include billing information, such as credit card information or an equivalent, for electronically billing the online account user 64. It will be appreciated by one of ordinary skill in the art that each online account user 64 can have one or more accounts. For example, the online account user 64 can have a business account and a personal account both operated using one or more of the plurality of session clients 12.

Figure 4:
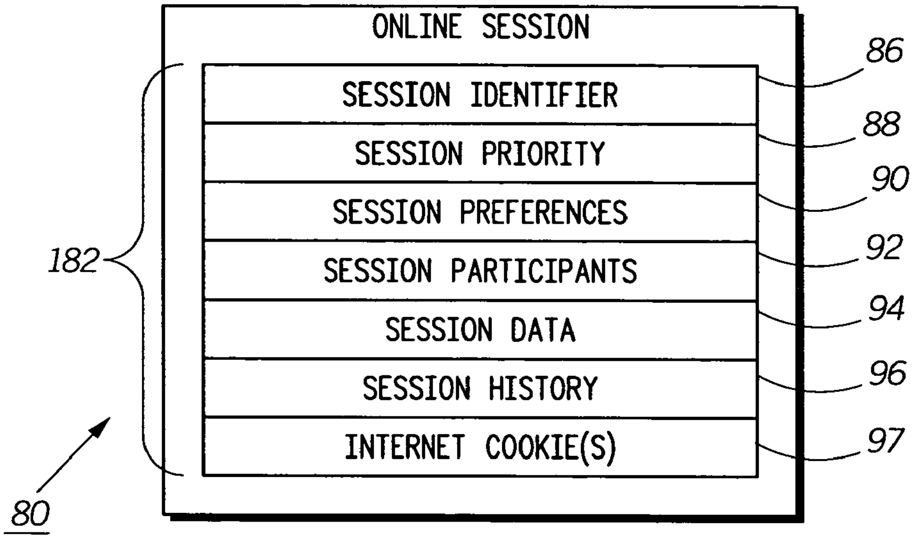
FIG. 4 illustrates an online session for use within the online server of FIG. 2.

FIG. 4 illustrates a plurality of session information 182 for an online session 80 for use within the online server 34 of FIG. 2, in accordance with the preferred embodiment of the present invention. The online session 80 can be any of the plurality of online sessions 54 such as a first online session 82 and/or a second online session 84 as illustrated in FIG. 2. As illustrated in FIG. 4, for each online session 80, the online server 34 preferably stores a session identifier 86, a session priority 88, a plurality of session preferences 90, a plurality of session participants 92, a plurality of session data 94, a session history 96, and one or more Internet cookie(s) 97 per session. It will be appreciated by one of ordinary skill in the art that the plurality of session information 182 stored in the online server 34 for the online session 80, in accordance with the present invention, can include any of the session information mentioned herein or an equivalent.

Preferably, the session identifier 86 identifies the online session 80 of the plurality of online sessions 54. In one embodiment, the online session 80 is assigned the session priority 88. The session priority 88 determines or identifies the priority of the online session 80 within the plurality of online sessions 54 currently active within the online server 34. The session priority 88 can be set through a predetermined algorithm in the online server 34 taking into account the various characteristics of the online session 80. The session priority 88 can for example, specify a communication priority order, an information updating priority order, and/or a session processing order. It will be appreciated by one of ordinary skill in the art that the session priority 88 can specify any of the priorities mentioned herein or an equivalent.

The plurality of session preferences 90 define certain attributes settable by the online session owner. The plurality of session preferences 90, for example, can include text font attributes, filter settings, blocking settings, alert settings, screen names, buddy list groups, electronic mailboxes, parental control settings, an alert option (such as alert on receipt of a new real time session event or no alert on receipt of a new real time session event), guaranteed or non-guaranteed delivery, timeout setting for participation in the online session 80, and number of session events and/or messages to retain in the session history 96. It will be appreciated by one of ordinary skill in the art that the plurality of session preferences 90, in accordance with the present invention, can include any of the session preferences mentioned herein or an equivalent. In one embodiment, the plurality of session preferences 43 includes a session timer. The session timer is a preset time period upon which the online session 80 is active.

In one embodiment, the plurality of session preferences 90 includes one or more Internet cookie(s) 97 per session. The session Internet cookie is a piece of information that is maintained on the session client 22 by the online server 34. Information contained with the session Internet cookie can, for example, contain the session device type and capabilities, the software application version, and advertisement interests. The session Internet cookie is processed based on a two-stage process. First, the session Internet cookie is stored in the online account user's device, such as the session device containing the session client 22, normally without the online account user's knowledge. One of the functions of the session Internet cookie is to provide personal customization when an online website is re-visited. For example, with customizable web search engines, the online account user 64 selects categories of interest from the online website page. The online server 34 then creates a specific session Internet cookie, which is essentially a tagged string of text containing the user's preferences, and transmits this session Internet cookie to the online account user's device. The online account user's web browser, if cookie-savvy, receives the session Internet cookie and stores it in a special file called a cookie list.

During the second stage, the session Internet cookie is automatically transferred from the online account user's device to the online server 34. Whenever the online account user 64 directs his/her web browser to display a certain web page from the online server 34, the browser will transmit the session Internet cookie containing personal information to the online server 34, whereby the online server 34 formats the content in a personalized manner including directed advertisements.

The plurality of session participants 92 includes each of the plurality of online account users 56 participating in the online session 80 along with the online account user data as illustrated in FIG. 3.

Figure 5:
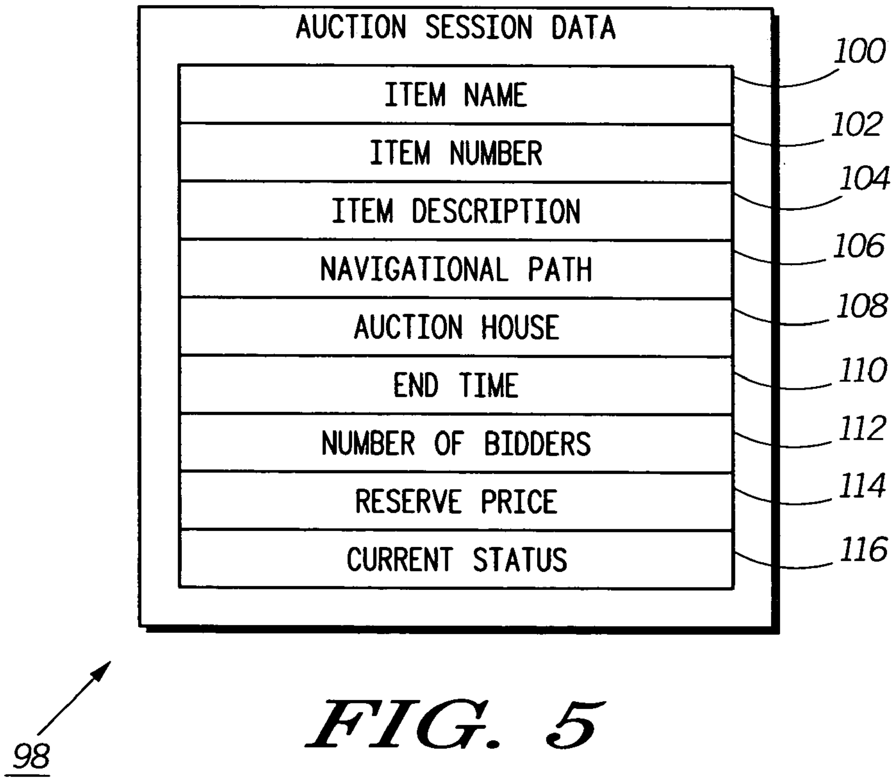
FIGS. 5 and 6 illustrate various embodiments of session data for use within the session of FIG. 4.
Figure 6:
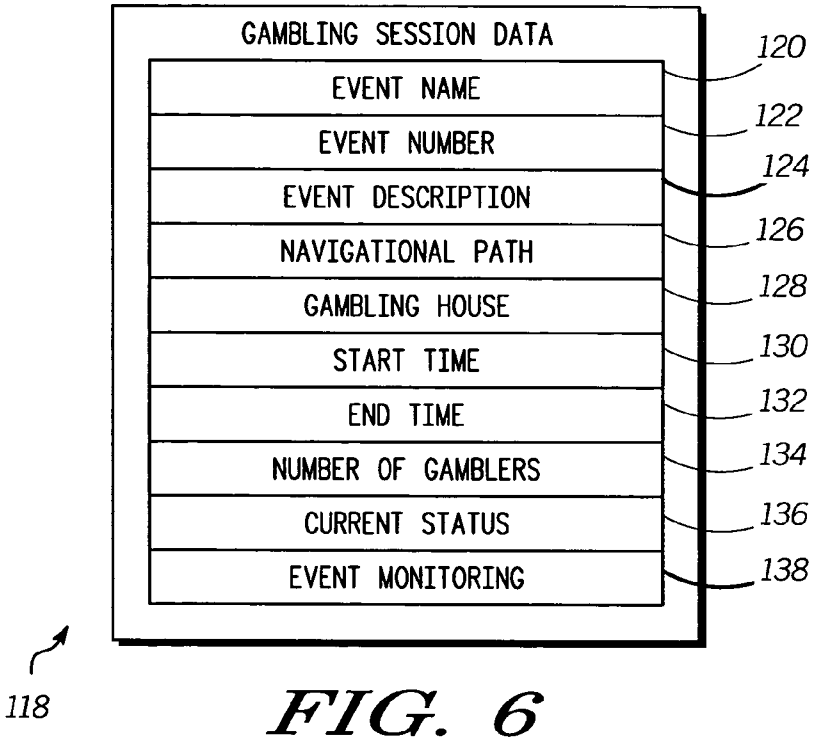

The plurality of session data 94 includes all pertinent data and information related to the online session 80. FIGS. 5 and 6 illustrate two examples of the plurality of session data 94 in accordance with the preferred embodiment of the present invention. It will be appreciated by one of ordinary skill in the art that the plurality of session data 94 can include the session data illustrated in FIGS. 5 and 6 or an equivalent.

FIG. 5 illustrates auction session data 98 stored by the online server 34 when the online session 80 is an online auction session. Preferably, the auction session data 98 includes an item name 100, an item number 102, an item description 104, a navigational path 106, an auction house 108, an end time 110, a number of bidders 112, a reserve price 114, and a current status 116. It will be appreciated by one of ordinary skill in the art that the auction session data 98 as illustrated in FIG. 5, in accordance with the present invention, can include those items mentioned herein or an equivalent. For example, the auction session data can include an auction type.

The navigational path 106 can include, for example, a navigational path to the item of interest, for example a Uniform Resource Locator (URL) of the item within the online auction session. URLs are short strings that identify resources in the Internet computer network 16, including documents, images, downloadable files, services, electronic mailboxes, and other resources. They make resources available under a variety of naming schemes and access methods (such as HTTP (Hypertext Transfer Protocol), FTP (File Transfer Protocol), and Internet protocol mail addressable in the same simple way).

FIG. 6 illustrates gambling session data 118 stored by the online server 34 when the online session 80 is an online gambling session. The gambling session, for example, can be a real time gambling session such as horse and/or dog racing, boxing matches, football, basketball, soccer, baseball, hockey games and car and/or boat racing. Further, the online gambling session can be non-real time such as server-based card games where a player can suspend play and return later, and/or a slot machine session. Preferably, the gambling session data 118 includes an event name 120, an event number 122, an event description 124, a navigational path 126, a gambling house 128, a start time 130, an end time 132, a number of gamblers 134, a current status 136, and an event monitoring 138. The navigational path 126 can include, for example, a URL of the event of interest in the online gambling session. It will be appreciated by one of ordinary skill in the art that the gambling session data 18, in accordance with the present invention, can be any of the data mentioned herein or an equivalent.

Figure 7:
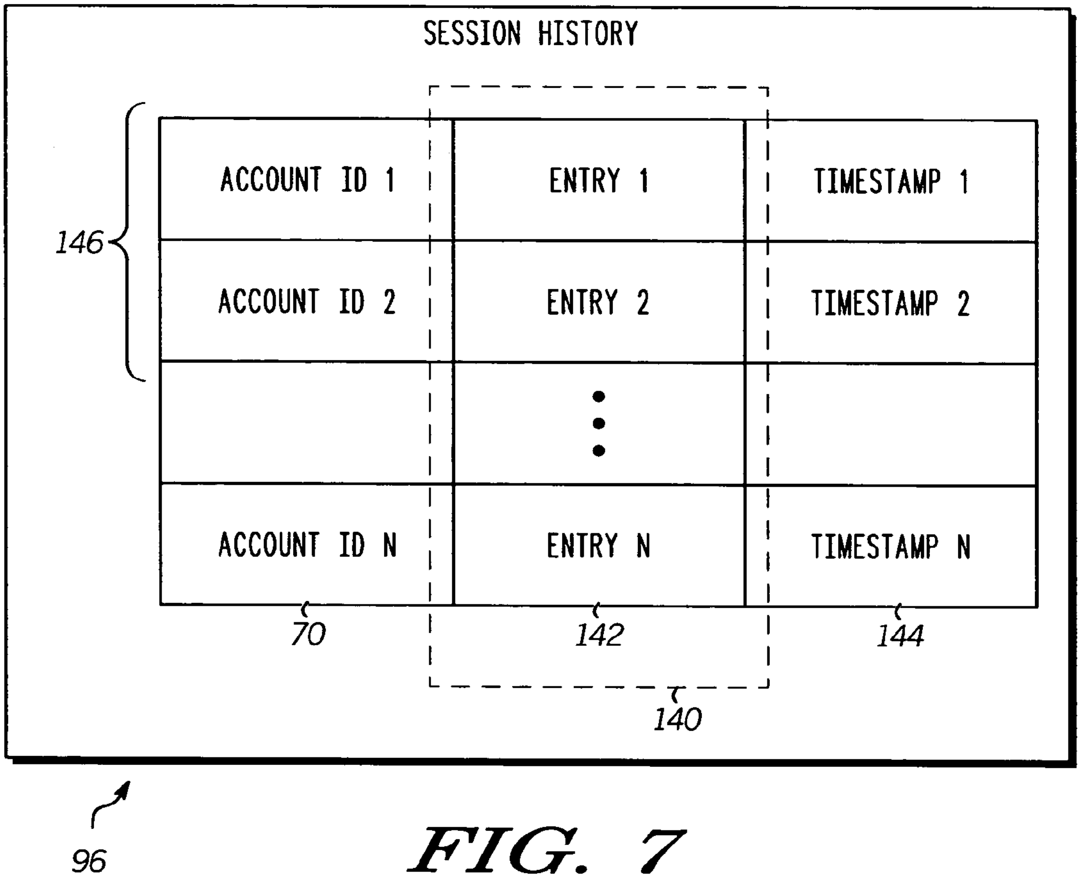
FIG. 7 illustrates a session history for use within the online session of FIG. 4.

FIG. 7 illustrates the session history 96 for use within the online session 80 of FIG. 4, in accordance with the preferred embodiment of the present invention. As illustrated in FIG. 7, the session history 96 preferably includes a plurality of session entries 140 in which each session entry 142 is associated with a plurality of entry information including the account identifier 70 for an associated entry originator such as the online account user 64. The associated entry originator, for example, is one of the plurality of session participants 92. Each session entry 142 further can be associated with a timestamp 144 identifying the time that the session entry 142 was entered into the online session 80 by the entry originator. The session history 96 is further composed of at least one session portion 146. Each session portion 146 comprises at least one session entry 142 and associated information. It will be appreciated by one of ordinary skill in the art that although the session portion 146 is illustrated as a portion of the session history 96, alternatively, in accordance with the present invention, the session portion 146 can be any portion of the plurality of session data 94.

Figure 8:
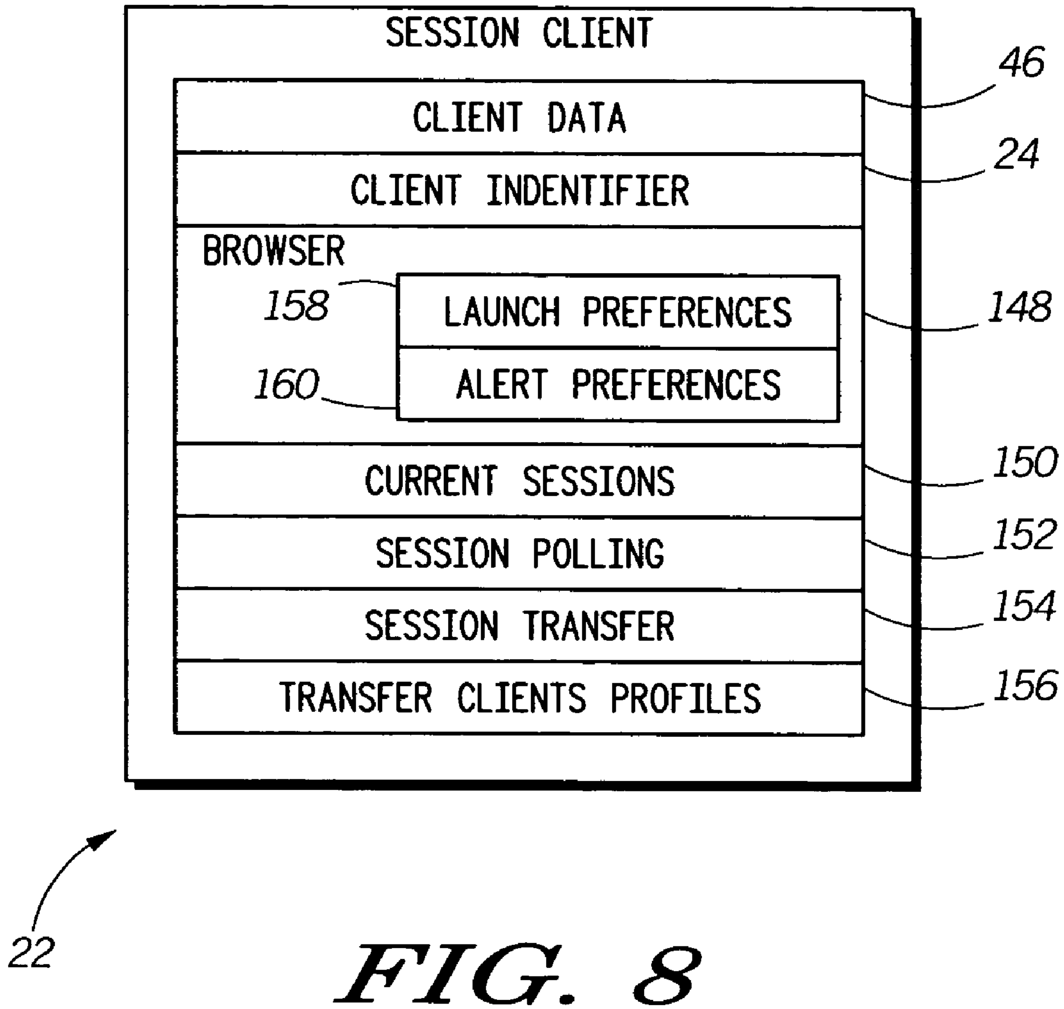
FIG. 8 illustrates a session client for use within the online communication system of FIG. 1.

FIG. 8 illustrates the session client 22 for use within the online communication system 10 of FIG. 1, in accordance with the preferred embodiment of the present invention. It will be appreciated by one of ordinary skill in the art that the session client 22 as illustrated in FIG. 8 can be any of the plurality of session clients 12 illustrated in FIG. 1, such as the first session client 18 and/or the second session client 20. The session client 22 preferably includes the plurality of client data 46, the client identifier 24, a browser 148, a plurality of current sessions 150, a session polling 152, a session transfer 154, and a plurality of transfer clients' profiles 156.

The browser 148 preferably includes a plurality of launch preferences 158 and a plurality of alert preferences 160. The browser 148 is preferably a software application programmed within the session client 22 to enable the online account user 64 to find and view information on the plurality of online servers 14 via the Internet computer network 16. The browser 148, for example, can be a text-based browser using "point-and-click" graphical manipulations. The browser 148 can preferably interpret the Hyper Text Markup Language (HTML) tags in downloaded documents and format the displayed data according to a set of standard style rules. The browser 148 can be hard coded or programmed into the session device, within which the session client 22 resides, during manufacturing, can be programmed over-the-air upon customer subscription, or can be a downloadable application. It will be appreciated that other programming methods can be utilized for programming the browser 148. It will be further appreciated by one of ordinary skill in the art that the browser 148 alternatively can be hardware circuitry.

The plurality of launch preferences 158 within the browser 148 includes data programmable by the online account user 64, such as when the session client 22 will launch and connect to the online server 34. For example, the online account user 64 can program the plurality of launch preferences 158 to launch the session client 22 at a predetermined time prior to the end time 110 of an online auction session or the end time 132 of an online gambling session to allow the online account user 64 to compete against other bidders or gamblers respectively. In one embodiment of the present invention, the plurality of launch preferences 158 can include a preference that, if an auto participate launch is enabled, it will not be launched if the session device in which the session client 22 operates is not located near the body since there is no one to participate unless an auto bid program has been loaded and turned on. Alternatively, the plurality of launch preferences 158 can include a preference that, if the session device in which the session client 22 operates is not connected to the online session 80 when it had expired, the session client 22, through the browser 148, automatically goes to the site and retrieves the final results. Similarly, the plurality of launch preferences 158 can include automatically retrieving the final results of the online session 80 in the case an agent was bidding on the buyer's behalf.

The plurality of alert preferences 160 of the browser 148 preferably includes alert information programmable by the online account user 64. For example, the plurality of alert preferences 160 can include a "user aware alert" that would notify the user that the session client 22 was able to take action on the auctioned item or the gambling event and not just in process of linking to the item or event. In one embodiment, the plurality of alert preferences 160 can include an entry notification alert that would notify the online account user 64 when a new entry for the online session 80 in which the online account user 64 is participating is received. For example, an alert can be generated when the bid price changes in an online auction session. The alert preferably includes a data message with the new bid price and the incremental change. Alternatively, a particular level of incremental change could trigger an alert. In another embodiment, the plurality of alert preferences 160 can include an entry deletion alert that would notify the online account user 64 when an unread entry for the online session 80 in which the online account user 64 is participating is to be deleted from the memory. Alternatively, the plurality of alert preferences 160 can include a preference that no alert can be sent when a new entry is received and stored in the memory. It will be appreciated by one of ordinary skill in the art that other alerting schemes are within the scope of the present invention.

The plurality of current sessions 150 preferably includes an identification of all online sessions for which the session client 22 is currently participating. The plurality of current sessions 150, for example, can be any of the plurality of online sessions 54 such as the online session 80, the first online session 82 and/or the second online session 84 of FIG. 2.

The plurality of transfer clients' profiles 156 preferably includes the client profile 246 for each of the plurality of session clients 12 for which the session client 22 can transfer the plurality of session information 182 as required and/or desired. The client profile 246 can, for example, include the connection type (wide area network, short range wireless, infrared data association (IrDA), Universal Ser. Bus (USB), or serial). If a wide or local area network was used for communication, the client profile 246 can further include routing information that can be converted to an IPv4/ MAC or IPv6 address. A user friendly name, such as a URL, a Uniform Resource Identifier (URI), a phone number or a Domain Name Server (DNS), can be used to access a database to obtain the routing information (IP addressing).

FIG. 9 illustrates the plurality of client data 46 included within the session client 22 of FIG. 8. It will be appreciated by one of ordinary skill in the art that the plurality of client data 46 as illustrated in FIG. 9 can be the first client data 50 or the second client data 52. As illustrated, the plurality of client data 46 preferably includes a client version identifier 162, a current account identifier 164, an authentication key 166, a plurality of user preferences 168, and a plurality of current session data 170. It will be appreciated by one of ordinary skill in the art that the plurality of client data 46 can include any of the client data mentioned herein or an equivalent.

The client version identifier 162 is preferably the name and version or other similar indication of the session client 22 being used. The current account identifier 164 is preferably a user name or other identification of the online account user 64 currently using the session client 22. The authentication key 166 preferably includes a code that is used to authenticate the online account user 64 to the online communication system 10. For example, the authentication key 166 can be derived from a password known only to the online account user 64 and the online communication system 10.

The plurality of user preferences 168 defines certain attributes settable by the account user 42 for communicating within the plurality of online sessions 54 using the session client 22. The plurality of user preferences 168, for example, can include text font attributes 176, filter settings 172, blocking settings, screen names per account identifier, alert settings per screen name 174, buddy list groups, electronic mailboxes, electronic voice mail, and parental control settings. It will be appreciated by one of ordinary skill in the art that the plurality of user preferences 168, in accordance with the present invention, can include any of those preferences mentioned herein or an equivalent.

In a preferred embodiment of the present invention, the plurality of user preferences 168 includes a plurality of Internet cookies 178. The session client 22 receives each of the plurality of Internet cookies 178, which is essentially a tagged string of text containing the user's preferences, from an associated one of the plurality of online servers 14.

The plurality of current session data 170 contains information relating to each of the plurality of online sessions 54 in which the account user 42 is currently participating, has previously participated, or plans to participate, using the session client 22. The plurality of current session data 170 preferably includes a session server identification 180 and a plurality of session information 182 for each online session 80 stored within the session client 22. For example, a first session server identification 184 and a plurality of first session information 186 are stored within the plurality of current session data 170 for a first current session 188. Similarly, a second session server identification 190 and a plurality of second session information 192 for a second current session 194 are stored within the plurality of current session data 170. The session server identification 180, such as the first session server identification 184 and the second session server identification 190, can be, for example, a unique selective call address in a wireless messaging system. Alternatively, the session server identification 180 can be an IP address, or an IP address and associated number of the port assigned to the online server 34 associated with the online session 80. It will be appreciated by one of ordinary skill in the art that the session server identification 180 can be one mentioned herein or an equivalent. The server identification 180 enables the communication between the session client 22 and the online server 34 hosting the online session 80.

Similar to that illustrated in FIG. 4, for each online session 80 included within the plurality of current session data 170, the session client 22 preferably stores the plurality of session information 182, such as the session identifier 86, the session priority 88, the plurality of session preferences 90, the plurality of session participants 92, the plurality of session data 94, the session history 96, and the session Internet cookie 97, as illustrated and described previously in FIG. 4. It will be appreciated by one of ordinary skill in the art that the plurality of session information 182, in accordance with the present invention, can include any of the session information mentioned herein or an equivalent.

Figure 10:
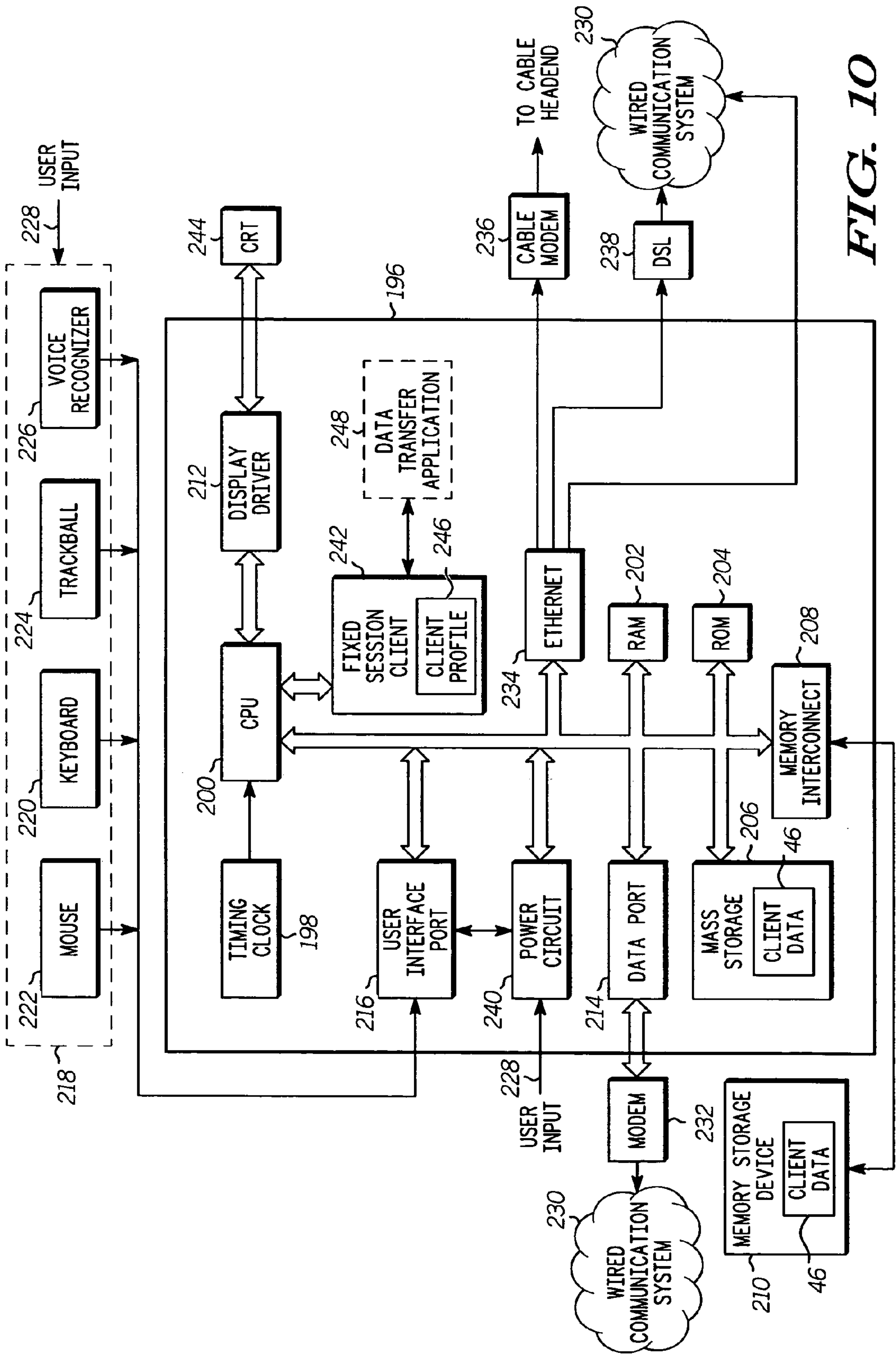
FIGS. 10, 11, and 12 are electronic block diagrams of various embodiment of a session device in which a session client of FIG. 8 operates.

FIG. 10 is an electronic block diagram of one embodiment of a session device in which the session client 22 of FIG. 8 operates. Specifically, FIG. 10 illustrates a fixed network device 196. The fixed network device 196 can operate for example on a local area network (LAN), a wide area network (WAN), or a combination of both. The fixed network device 196 can be one of a plurality of spatially co-located computers which are typically located within a room, building or campus of buildings and are sharing common resources and communicating with each other on a computer network in a manner well known to one of ordinary skill in the art. Typical resources shared are files on a file server, printers on a print server, and electronic message (email) services on an email server. The fixed network device 196 can operate on a network that uses a physical network, such as ARCNET, Ethernet, Token-ring, Local Talk or other network media, to connect the computers, which represent wired network nodes into the network. The fixed network device 196 can operate on a LAN that employs any one of a number of networking protocols, such as TCP/IP (Transmission Control Protocol/Internet Protocol), AppleTalk™, IPX/SPX (Inter-Packet Exchange/Sequential Packet Exchange), Net BIOS (Network Basic Input Output System) or any other packet structures, to enable the communication among the devices and/or between the devices and the shared resources. Further the fixed network device 196 can operate on a WAN that uses a different physical network media, such as X.25, Frame Relay, ISDN, Modem dial-up or other media, to connect other computers or other local area networks. In the following description, the term "fixed network device" includes any of the session devices operating as described above or an equivalent.

As illustrated, the fixed network device 196 comprises a timing clock 198, a central processing unit 200, an electronic memory preferably in the form of a random access memory (RAM) 202 and/or a read only memory (ROM) 204, and a mass storage element (e.g., a disk drive or the like) 206. In one embodiment, the fixed network device 196 includes a memory interconnect 208 for operatively connecting a memory storage device 210 to the fixed network device 196. The memory interconnect 208 can, for example, comprise a structure for physically engaging external contacts on the memory storage device 210 so that the memory storage device 210 is directly connected to the fixed network device 196. It will be appreciated by one of ordinary skill in the art that the memory interconnect 208 can also be a wireless connection such as an infrared, Bluetooth or radio frequency interface. When the memory interconnect 208 is connected to the memory storage device 210, the fixed network device 196 can access a plurality of memory information such as the plurality of client data 46 from the memory storage device 210.

The fixed network device 196 further preferably comprises a display driver 212, a general I/O interface or data port 214, and a user interface port 216 that accommodates a user interface 218 including any number of input means for general information entry. In the preferred embodiment, the user interface 218 (e.g., a keyboard 220, a "mouse" 222, a pen or puck activated tablet (not shown), a trackball 224, an audio activated command recognition processor 226, or the like) allows a device user to enter and manipulate information using a user input 228. After information is entered, it can be communicated to a wired communication system 230 via a conventional modem 232 or the like. Preferably, the fixed network device 196 also includes an Ethernet connection 234 for communicating to the wired communication system 230 or for communicating either through a conventional cable modem 236 to a cable headend or through a (Digital Subscriber Line) DSL connection 238 to the wired communication system 230. The fixed network device 196 can be changed from an active to an inactive state, or from an inactive state to an active state, through the user input 228 to a power circuit 240. The power circuit 240 can be operated manually via the user input 228 directly to the power circuit 240, manually via the user input 228 to the user interface 218, or alternatively automatically via the programming of the CPU 200.

In a preferred embodiment of the present invention, the fixed network device 196 of FIG. 10 includes a fixed session client 242. It will be appreciated by one of ordinary skill in the art that the fixed session client 242 can be the first session client 18, the second session client 20, or any other of the plurality of session clients 12 of FIG. 1 with a structure as illustrated in FIG. 8. The fixed network device 196 performs online session functions within the fixed session client 242 using the plurality of client data 46 stored in the electronic memory of the fixed network device 196. The fixed session client 242 can be hard coded or programmed into the fixed network device 196 during manufacturing, can be programmed over-the-air upon customer subscription, or can be a downloadable application. It will be appreciated that other programming methods can be utilized for programming the fixed session client 242 into the fixed network device 196. It will be further appreciated by one of ordinary skill in the art that the fixed session client 242 can be hardware circuitry within the fixed network device 196.

Preferably, the fixed session client 242 automatically updates a CRT 244 when a new session entry has been sent or received by sending a command to the display driver 212. This allows the session history 96 to be updated while the device user is reading it without disturbing the CRT 244. The fixed session client 242 uses the plurality of client data 46 stored in the electronic memory or stored in the memory storage device 210 to perform functions relating to the plurality of online sessions 54. It will be appreciated by one of ordinary skill in the art that fixed networked devices having software-programming capabilities can include client data 46 that is specialized and personalized, such as the plurality of user preferences 168, including display options and screens for each account user 42, or similarly can include the plurality of session preferences 90 for each online session 80. Alternatively, fixed networked devices that do not include software-programming capabilities can include the plurality of client data 46, including user preferences 168 that are standard, pre-defined display options and screens for the plurality of current sessions in which the fixed session client 242 is participating.

The plurality of user preferences 168 of the plurality of client data 46 used by the fixed session client 242 further includes various alert options. In one embodiment, the fixed session client 242 notifies the CPU 200 to send a command to an alert circuit (not shown) when new session entries or event information is received and/or when the current time either equals an event time or is within a predetermined time differential of an event time. In another embodiment, the fixed session client 242 notifies the CPU 200 to send a command to the alert circuit when an unread session entry is to be deleted from the memory. Alternatively, no alert can be sent when new session entries or event information is received and stored in the memory. It will be appreciated by one of ordinary skill in the art that other alerting schemes are within the scope of the present invention. Further, the CPU 200 can send a command to the alert circuit in response to user input 228 through the user interface 218 to the user interface port 216, such as in response to a device user depressing a button or series of buttons, or, in response to receipt of a message, the CPU 200 can initiate an input signal to the fixed session client 242. The fixed session client 242, in response to the input signal, accesses the plurality of client data 46 stored in the electronic memory for use in operation of the fixed session client 242.

Preferably, the fixed session client 242 includes the client profile 246. The client profile 246 includes information regarding the capabilities and limitations of the fixed session client 242 and also of the fixed network device 196. For example, the client profile 246 can include indication of the media supported by the fixed session client 242 (e.g., audio, video), indication of which features are supported by the fixed session client 242, device type, device display, device battery life, device battery capacity, device processing power, and access to alternate networks. It will be appreciated by one of ordinary skill in the art that the client profile 246 can include any of those capabilities and limitations mentioned above in any combination or an equivalent.

In accordance with the present invention, the fixed session client 242 includes software capability for transferring all or a portion of the plurality of client data 46 to one or more other session clients for use by the other session client to participate within one or more of the plurality of online sessions 54 within one or more of the plurality of online servers 14. The fixed session client 242, in accordance with the present invention, further includes software capability for receiving all or a portion of the plurality of client data 46 from at least one other session client to participate within one or more of the plurality of online sessions 54 within one or more of the plurality of online servers 14. As illustrated in FIG. 10, the software capability for transferring and/or the capability for receiving the plurality of client data 46 can be incorporated into the fixed session client 242, or alternatively can be contained within a separate data transfer application 248. The data transfer application 248, for example can be a third party software add-on that is compatible with existing session client software applications (e.g., the fixed session client 242) already programmed into the fixed network device 196. Maintaining the data transfer software on a separate data transfer application 248 minimizes incorporation timeframes and also the cost of upgrading the fixed network device 196 to include this feature.

Figure 11:
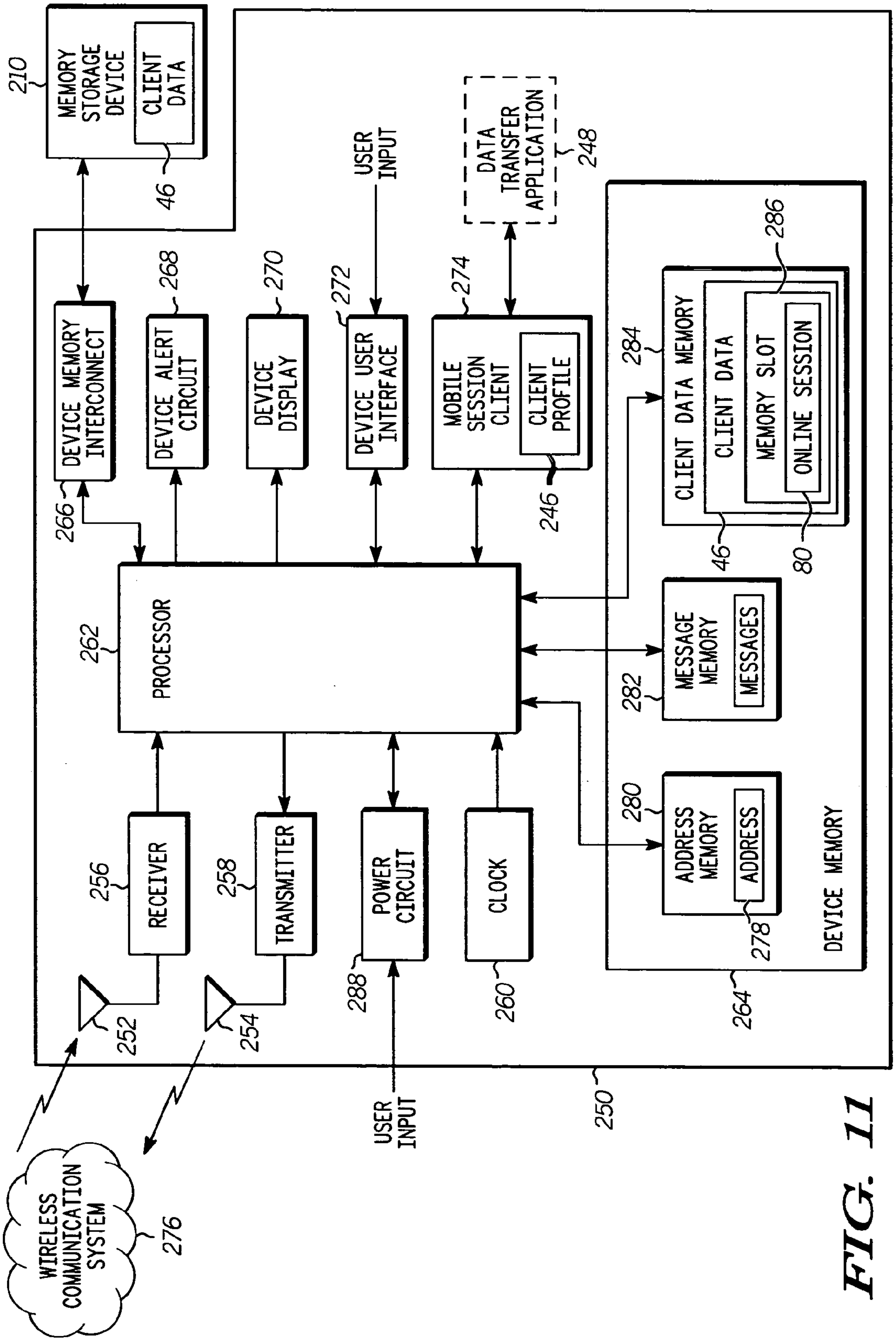

FIG. 11 is an electronic block diagram of one embodiment of a session device in which the session client 22 of FIG. 8 operates. Specifically, FIG. 11 illustrates a mobile device 250. It will be appreciated by one of ordinary skill in the art that the mobile device 250 in accordance with the present invention, can be a mobile cellular telephone, a mobile radio data terminal, a mobile cellular telephone having an attached data terminal, or a two way pager, such as the "Pagewriter 2000X" manufactured by Motorola Inc. of Schaumburg, Ill. In the following description, the term "mobile device" refers to any of the session devices mentioned above or an equivalent.

As illustrated in FIG. 11, the mobile device 250 includes a first antenna 252, a second antenna 254, a receiver 256, a transmitter 258, a clock 260, a processor 262, a device memory 264, a device memory interconnect 266, a device alert circuit 268, a device display 270, a device user interface 272 and a mobile session client 274.

The first antenna 252 intercepts transmitted signals from a wireless communication system 276. It will be appreciated by one of ordinary skill in the art that the wireless communication system 276, in accordance with the present invention, can function utilizing any wireless radio frequency (RF) channel, for example, a one or two-way pager channel, a mobile cellular telephone channel, or a mobile radio channel. Similarly, it will be appreciated by one of ordinary skill in the art that the wireless communication system 276 can function utilizing other types of communication channels such as infrared channels. In the following description, the term "wireless communication system" refers to any of the wireless communication systems mentioned above or an equivalent.

The first antenna 252 is coupled to the receiver 256, which employs conventional demodulation techniques for receiving the communication signals transmitted by the wireless communication system 276. Coupled to the receiver 256 is the processor 262 utilizing conventional signal-processing techniques for processing received messages. Preferably, the processor 262 is similar to the MC68328 micro-controller manufactured by Motorola, Inc. of Schaumburg, Ill. It will be appreciated by one of ordinary skill in the art that other similar processors can be utilized for the processor 262 and that additional processors of the same or alternative type can be utilized as required to handle the processing requirements of the processor 262. The processor 262 decodes an address in the demodulated data of the received message, compares the decoded address with one or more addresses 278 stored in an address memory 280 of the device memory 264, and, when a match is detected, proceeds to process the remaining portion of the received message.

To perform the necessary functions of the mobile device 250, the processor 262 is coupled to the device memory 264, which preferably includes a random access memory (RAM), a read-only memory (ROM), and an electrically erasable programmable read-only memory (EEPROM)(not shown). The device memory 264 includes the address memory 280, a message memory 282, and a client data memory 284.

Once the processor 262 has processed a received message, it stores the decoded message in the message memory 282 of the device memory 264. It will be appreciated by one of ordinary skill in the art that the message memory 282, in accordance with the present invention, can be a voicemail box or a group of memory locations in a data storage device. In the following description, the term "message memory" refers to any of the memory means mentioned above or an equivalent. Preferably, when the received message is a message for participation in one of the plurality of online sessions 54 (for example, the session entry 142), the processor 262 stores the decoded message in the client data memory 284.

In one embodiment, the mobile device 250 includes the device memory interconnect 266 for operatively connecting the memory storage device 210 to the mobile device 250. The device memory interconnect 266 can, for example, comprise a structure for physically engaging external contacts on the memory storage device 210 so that the memory storage device 210 is directly connected to the mobile device 250. It will be appreciated by one of ordinary skill in the art that the device memory interconnect 266 can also be a wireless connection such as an infrared, Bluetooth or radio frequency interface. When the device memory interconnect 266 is connected to the memory storage device 210, the mobile device 250 can access a plurality of memory information such as the plurality of client data 46 from the memory storage device 210.

Figure 12:
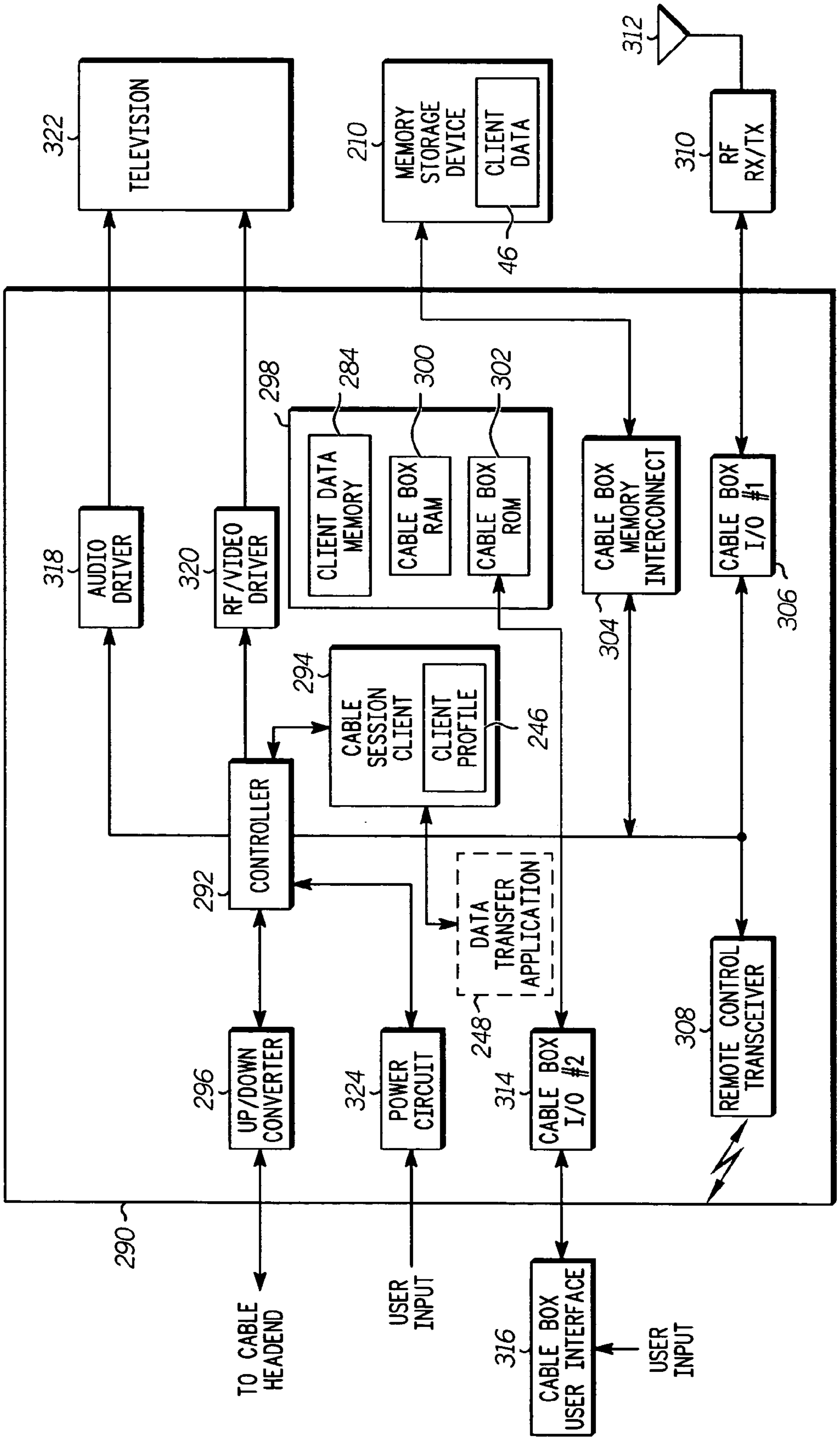

The client data memory 284 includes the plurality of client data 46 as described previously in FIG. 9. The client data memory 284 includes a memory slot 286 for each online session 80 in which the mobile device 250 has subscribed. The memory slot 286, in accordance with the present invention, includes the plurality of session data as illustrated in FIG. 9 and FIGS. 4-7. The plurality of session entries 140 associated with the online session 80 is stored together in chronological order in the memory slot 286 similar to the session history 96 of FIG. 7. The memory slot 286 is preferably allocated a fixed amount of memory for storing associated plurality of session data. The memory slot 286 holds multiple session entries in a single memory slot. Any session entries received for the online session 80 along with its associated session information is appended at the end of the plurality of session entries already in the memory slot 286. If the amount of allocated memory for the memory slot 286 is exceeded, the older session entries are deleted. It will be appreciated by one of ordinary skill in the art that, in accordance with the present invention, the client data memory 284 and associated operation herein described, in accordance with the present invention, can be included in the fixed network device 196 of FIG. 10, a cable box as illustrated in FIG. 12, or any other session device in which the session client 22 operates.

Upon receipt and processing of a message, the processor 262 preferably generates a command signal to the device alert circuit 268 as a notification that the message has been received and stored. The device alert circuit 268 can include a speaker (not shown) with associated speaker drive circuitry capable of playing melodies and other audible alerts, a vibrator (not shown) with associated vibrator drive circuitry capable of producing a physical vibration, or one or more LEDs (not shown) with associated LED drive circuitry capable of producing a visual alert. It will be appreciated by one of ordinary skill in the art that other similar alerting means as well as any combination of the audible, vibratory, and visual alert outputs described can be used for the device alert circuit 268.

Upon receipt and processing of a message, the processor 262 preferably also generates a command signal to the device display 270 to generate a visual notification of the receipt and storage of the message. When the device display 270 receives the command signal from the processor 262 that the message has been received and stored in the device memory 264, a message indication is displayed. The message indication, for example can be the activation of one of a plurality of message icons on the device display 270. The device display 270 can be, for example, a liquid crystal display utilized to display text. It will be appreciated by one of ordinary skill in the art that other similar displays such as cathode ray tube displays can be utilized for the device display 270.

The mobile device 250 preferably further includes the clock 260. The clock 260 provides timing for the processor 262. The clock 260 can include the current time for use in the operation of the mobile device 250. The clock 260 also provides a source for timing of feature enhancements such as active and inactive periods of operation or periods of alerting.

In a preferred embodiment, the mobile device 250 includes the mobile session client 274. It will be appreciated by one of ordinary skill in the art that the mobile session client 274 can be the first session client 18, the second session client 20, or any other of the plurality of session clients 12 of FIG. 1. The mobile session client 274 performs session operation functions within the mobile device 250 using the plurality of client data 46 stored in the client data memory 284. The mobile session client 274 can be hard coded or programmed into the mobile device 250 during manufacturing, can be programmed over-the-air upon customer subscription, or can be a downloadable application. It will be appreciated that other programming methods can be utilized for programming the mobile session client 274 into the mobile device 250. It will be further appreciated by one of ordinary skill in the art that the mobile session client 274 can be hardware circuitry within the mobile device 250.

Preferably the mobile session client 274 automatically updates the device display 270 when a new session entry has been sent or received. This allows the session history 96 to be updated while the account user 42 is reading it without disturbing the device display 270. The mobile session client 274 uses the plurality of client data 46 stored in the electronic memory or stored in the memory storage device 210 to perform functions relating to various received and/or sent session entries. It will be appreciated by one of ordinary skill in the art that mobile devices having software-programming capabilities can include specialized and personalized display options and screens for each online session 80. Alternatively, mobile devices that do not include software-programming capabilities can include standard, pre-defined display options and screens for the plurality of online sessions 54. In accordance with the present invention, the display options for the plurality of online sessions 54 in which the mobile session client 274 within the mobile device 250 is participating can be included in the plurality of session preferences 90 for each online session 80 or alternately, the display options can be stored independently within the plurality of user preferences 168 of the plurality of client data 46.

The mobile session client 274 further operates using various alert options. In one embodiment, the mobile session client 274 notifies the processor 262 to send a command to the device alert circuit 268 when a new session entry is added to the memory slot 286 of the client data memory 284 for the online session 80 or when the current time is an event time or within a predetermined window of an event time. In another embodiment, the mobile session client 274 notifies the processor 262 to send a command to the device alert circuit 268 when an unread session entry is to be deleted from the memory slot 286. Alternatively, no alert can be sent when a new session entry is received and stored in the client data memory 284 and/or when the current time is an event time. It will be appreciated by one of ordinary skill in the art that other alerting schemes are within the scope of the present invention. In accordance with the present invention, the alert options for the plurality of current sessions 150 in which the mobile session client 274 within the mobile device 250 is participating can be included in the plurality of session preferences 90 for each online session 80 or alternately, the alert options can be stored independently within the plurality of user preferences 168 of the plurality of client data 46.

In accordance with the present invention, the mobile session client 274 includes software capability for transferring all or a portion of the plurality of client data 46 to at least one other session client for use by the other session client to participate within one or more of the plurality of current sessions 150. The mobile session client 274, in accordance with the present invention, further includes software capability for receiving all or a portion of the plurality of client data 46 from another session client to participate within one or more of the plurality of online sessions 54. As illustrated in FIG. 11, the software capability for transferring and receiving client data can be incorporated into the mobile session client 274 (not shown) or alternatively contained within a separate data transfer application 248. The data transfer application 248, for example can be a third party software add-on that is compatible with existing online software applications (e.g., the mobile session client 274) already programmed into the mobile device 250. Maintaining the data transfer software on a separate data transfer application 248 minimizes incorporation timeframes and also the cost of upgrading a mobile device to include this feature.

Preferably, the device user interface 272 is coupled to the processor 262. The device user interface 272 can be one or more buttons used to generate a button press, a series of button presses, a voice response from the device user, or some other similar method of manual response initiated by the device user (such as the online account user 64) of the mobile device 250. The processor 262, in response to the device user interface 272, such as a device user depressing a button or series of buttons, or in response to receipt of a session message, initiates an input signal to the mobile session client 274. The mobile session client 272, in response to the user input signal, accesses the plurality of client data 46 in the client data memory 284 for use in operation of the mobile session client 274.

Preferably, the mobile session client 274 includes the client profile 246. The client profile 246 includes information regarding the capabilities and limitations of the mobile session client 274 and also of the mobile device 250. For example, the client profile 246 can include indication of the media supported by the mobile session client 274 (e.g., audio, video), indication of which features are supported by the mobile session client 274, device type, device protocol usage, device display, device battery life, device battery capacity, device processing power, and access to alternate networks. It will be appreciated by one of ordinary skill in the art that the client profile 246 can include any of those capabilities and limitations mentioned above in any combination or an equivalent.

The transmitter 258 is coupled to the processor 262 and is responsive to commands from the processor 262. When the transmitter 258 receives a command from the processor 262, the transmitter 258 sends a signal via the second antenna 254 to the wireless communication system 276.

In an alternative embodiment (not shown), the mobile device 250 includes one antenna performing the functionality of the first antenna 252 and the second antenna 254. Further, the mobile device 250 alternatively includes a transceiver circuit performing the functionality of the receiver 256 and the transmitter 258. It will be appreciated by one of ordinary skill in the art that other similar electronic block diagrams of the same or alternate type can be utilized for the mobile device 250 to handle the requirements of the mobile device 250.

The mobile device 250 can be changed from an active state to an inactive state or from an inactive state to an active state through a user input to a power circuit 288. The power circuit 288 can be operated manually via the user input to the power circuit 288, the user input to the device user interface 272, or alternatively automatically via the programming of the processor 262.

FIG. 12 is an electronic block diagram of one embodiment of a session device in which the session client 22 of FIG. 8 operates. Specifically, FIG. 12 illustrates an interactive broadcast receiver such as a cable box 290. The cable box 290 preferably allows network operators to deploy a wide range of interactive television broadcast services and applications on their networks. Further the cable box 290 preferably offers cable operators a combined, all-in-one, hardware and software solution for deploying interactive television services on their networks, thereby creating the ability for real time electronic message communication using television sets and networks.

As illustrated in FIG. 12, the cable box 290 preferably includes a controller 292 for controlling the operation of the cable box 290. Preferably, the controller 292 is similar to the MC68328 micro-controller manufactured by Motorola, Inc. of Schaumburg, Ill. It will be appreciated by one of ordinary skill in the art that other similar processors can be utilized for the controller 292, and that additional processors of the same or alternative type can be utilized as required to handle the processing requirements of the controller 292. Preferably, the controller 292 is programmed to function with a cable session client 294. The cable session client 294, in accordance with the present invention, operates similarly to the fixed session client 242 of FIG. 10 and the mobile session client 274 of FIG. 11 as described above. It will be appreciated by one of ordinary skill in the art that the cable session client 294 illustrated in FIG. 12 can be the first session client 18, the second session client 20, or any other of the plurality of session clients 12 of FIG. 1.

In accordance with the present invention, the cable session client 294 includes software capability for transferring all or a portion of the plurality of client data 46 to at least one other session client for use by the other session client to participate within one or more of the plurality of current sessions 150. The cable session client 294 further includes software capability for receiving all or a portion of the plurality of client data 46 from another session client to participate within one or more of the plurality of online sessions 54. As illustrated in FIG. 12, the software capability for transferring and receiving client data can be incorporated into the cable session client 294 (not shown) or alternatively contained within a separate data transfer application 248. The data transfer application 248, for example can be a third party software add-on that is compatible with existing online software applications (e.g., the cable session client 294) already programmed into the cable box 290. Maintaining the data transfer software on a separate data transfer application 248 minimizes incorporation timeframes and also the cost of upgrading a device to include this feature.

Preferably, the cable session client 294 includes the client profile 246. The client profile 246 includes information regarding the capabilities and limitations of the cable session client 294 and of the cable box 290. For example, the client profile 246 can include indication of the media supported by the cable session client 294 (e.g., audio, video), indication of which features are supported by the cable session client 294, device type, device protocol usage, device display, device battery life, device battery capacity, device processing power, and access to alternate networks. It will be appreciated by one of ordinary skill in the art that the client profile 246 can include any of those capabilities and limitations mentioned above in any combination or an equivalent.

The cable box 290 further includes an up/down converter 296 coupled to the controller 292 for communicating with a cable headend. To perform the necessary functions of the cable box 290, the controller 292 is further coupled to a cable box memory 298, which preferably includes a cable box random access memory (RAM) 300, a cable box read-only memory (ROM) 302, and an electrically erasable programmable read-only memory (EEPROM)(not shown). The cable box memory 298 of the cable box 290 preferably includes the client data memory 284 as previously described and illustrated in FIG. 11.

In one embodiment, the cable box 290 includes a cable box memory interconnect 304 for operatively connecting the memory storage device 58 to the cable box 136. The cable box memory interconnect 304 can, for example, comprise a structure for physically engaging external contacts on the memory storage device 210 so that the memory storage device 210 is directly connected to the cable box 290. It will be appreciated by one of ordinary skill in the art that the cable box memory interconnect 304 can also be a wireless connection such as an infrared, Bluetooth or radio frequency interface. When cable box memory interconnect 304 is connected to the memory storage device 210, the cable box 290 can access a plurality of memory information such as the plurality of client data 46 from the memory storage device 210.

Further coupled to the controller 292 is a first cable box I/O 306 for driving a remote control transceiver 308 and further for driving a radio frequency transceiver 310 connected to a cable box antenna 312. A second cable box I/O 314 for inputs from a user input via a cable box user interface 316 is further coupled to the controller 292. Also coupled to the controller 292 are an audio driver 318 and a radio frequency/video driver 320 for communicating with a television 322.

The cable box 290 can be changed from an active state to an inactive state or from an inactive state to an active state through a user input to a cable box power circuit 324. The cable box power circuit 324 can be operated manually via the user input to the cable box power circuit 324 or via the user input to the cable box user interface 316, or can be alternatively operated automatically via the programming of the controller 292.

Figure 13:
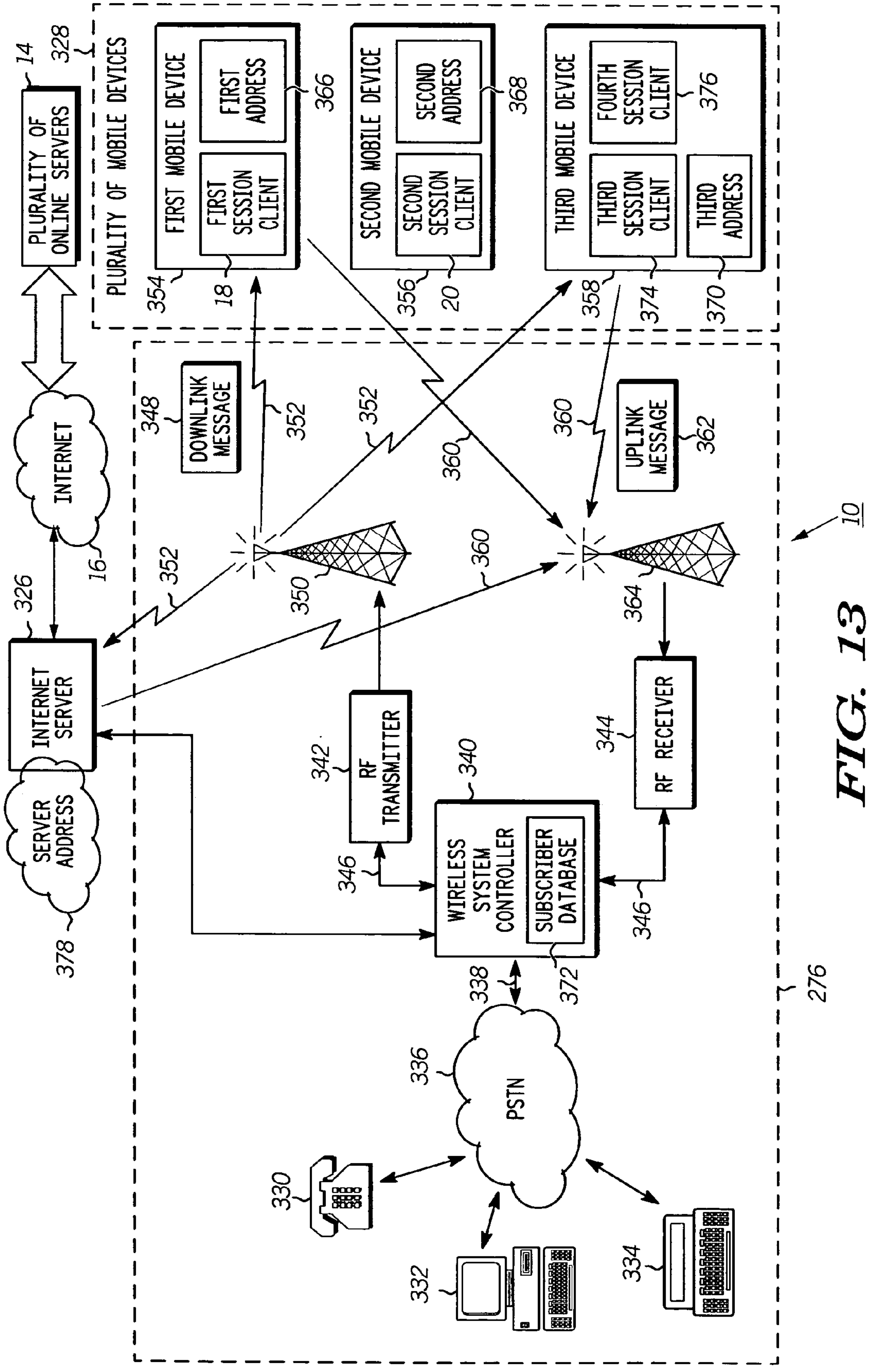
FIGS. 13 to 16 are electronic block diagrams of various embodiments of the online communication system of FIG. 1.

FIG. 13 is an electronic block diagram of one embodiment of the online communication system 10 of FIG. 1. Specifically, the online communication system 10 as illustrated in FIG. 13 includes an Internet server 326, the plurality of session clients 12 within a plurality of mobile devices 328, and the wireless communication system 276.

The wireless communication system 276, as illustrated in FIG. 13 includes a message input device for initiating messages into the wireless communication system 276. The message input device can be, for example, a telephone 330, a computer 332, a desktop messaging unit 334, or the Internet server 326 connected through a conventional public switched telephone network (PSTN) 336 through a plurality of telephone links 338 to a wireless system controller 340. The telephone links 338, for example, can be a plurality of twisted wire pairs, a fiber optic cable, or a multiplexed trunk line.

The wireless system controller 340 is coupled to and oversees the operation of at least one radio frequency (RF) transmitter 342 and at least one radio frequency (RF) receiver 344 through one or more communication links 346. The communication links 346 typically are twisted pair telephone wires, and additionally can include radio frequency (RF), microwave, or other communication links. The RF transmitter 342 and the RF receiver 344 are typically used with message store and forward stations that encode and decode inbound and outbound messages into formats that are compatible with landline message switched computers and personal radio addressing requirements, such as cellular messages, short messaging service, or paging protocols.

The wireless system controller 340 can also function to encode and decode wireless messages that are transmitted to or received by the RF transmitter 342 or the RF receiver 344. Telephony signals are typically transmitted to and received from the wireless system controller 340 by telephone sets, such as the telephone 330 or a mobile device. The wireless system controller 340 encodes and schedules outbound messages, such as a downlink message 348. The wireless system controller 340 then transmits the encoded outbound messages through the RF transmitter 342 via a transmit antenna 350 to the plurality of mobile devices 328, such as the mobile device 250 of FIG. 11, on at least one outbound radio frequency (RF) channel 352. The plurality of mobile devices 328, for example, includes a first mobile device 354, a second mobile device 356, and a third mobile device 358 each communicating through a wireless connection, such as the outbound RF channel 352 and an inbound RF channel 360. The downlink message 348 can be, for example, the plurality of client data 46, the session entry 142, the plurality of session information 182, or any other similar data.

Similarly, the wireless system controller 340 receives and decodes inbound messages, such as an uplink message 362, received by the RF receiver 344 via a receive antenna 364 on at least one inbound radio frequency (RF) channel 360 from one of the plurality of mobile devices 328. The uplink message 362 can be, for example, the plurality of client data 46, the session entry 142, the plurality of session information 182, or any other similar data.

Each of the plurality of mobile devices 328 assigned for use with the wireless communication system 276 has an address or identity assigned thereto which is a unique selective call address in the wireless communication system 276. For example, the first mobile device 354 has a first address 366, the second mobile device 356 has a second address 368, and the third mobile device 358 has a third address 370. It will be appreciated by one of ordinary skill in the art that other mobile devices assigned for use with the wireless communication system 276 have an address assigned thereto which is a unique selective call address in the wireless communication system 276. The address enables the transmission of the downlink message 348 from the wireless system controller 340 only to the mobile device having the address, and identifies the messages and responses received at the wireless system controller 340 from the mobile device with the address. In one embodiment, each of the plurality of mobile devices 328 also has a pin number assigned thereto, the pin number being associated with a telephone number within the PSTN 336. A list of the assigned addresses and correlated telephone numbers for each of the plurality of mobile devices 328 is stored in the wireless system controller 340 in the form of a subscriber database 372.

Preferably, at least one session client operates within a mobile device. For example, as illustrated in FIG. 13, the first session client 18 operates within the first mobile device 354 and the second session client 20 operates within the second mobile device 356. Similarly, a plurality of session clients can operate within the same mobile device. For example, a third session client 374 and a fourth session client 376 operate within the third mobile device 358. It will be appreciated by one of ordinary skill in the art that, in accordance with the present invention, a mobile device can include no session client, one session client, or a plurality of session clients.

In one embodiment of the present invention, the Internet server 326 is coupled to the wireless system controller 340 of the wireless communication system 276. The Internet server 326 provides a means for real time electronic communication between the plurality of mobile devices 328 and the plurality of online servers 14 via the Internet computer network 16. The Internet server 326, for example, receives a request and, in response to such request, sends a response via the wireless system controller 340. The wireless system controller 340 then routes the response to the requesting device which can be a message input device, such as the telephone 330, the computer 332, or the desktop messaging unit 334, or alternatively can be an individual or one of the plurality of mobile devices 328. In the following description, the term "requester" refers to any of the requesting devices mentioned above or an equivalent.

Preferably, the Internet server 326 includes a server address 378, which is a unique selective call address in the wireless communication system 276. The server address 378 enables the transmission, via the inbound RF channel 360, to the Internet server 326 of various real time electronic communications. The Internet server 326 similarly sends real time electronic communications to the plurality of mobile devices 328 via the outbound RF channel 352. Furthermore, the Internet server 326 can also have a pin number assigned thereto, the pin number being associated with a telephone number within the PSTN 336. The server address 378 and correlated telephone number is stored in the in the subscriber database 372 of the wireless system controller 340.

The coupling of the Internet server 326 to the wireless communication system 276 enhances the operation of the online communication system 10 by adding intelligence for multiple mobile devices to communicate in substantially real time with multiple online servers. The Internet server 326 interactively manages the messaging traffic associated with multiple online sessions in an efficient manner.

Figure 14:
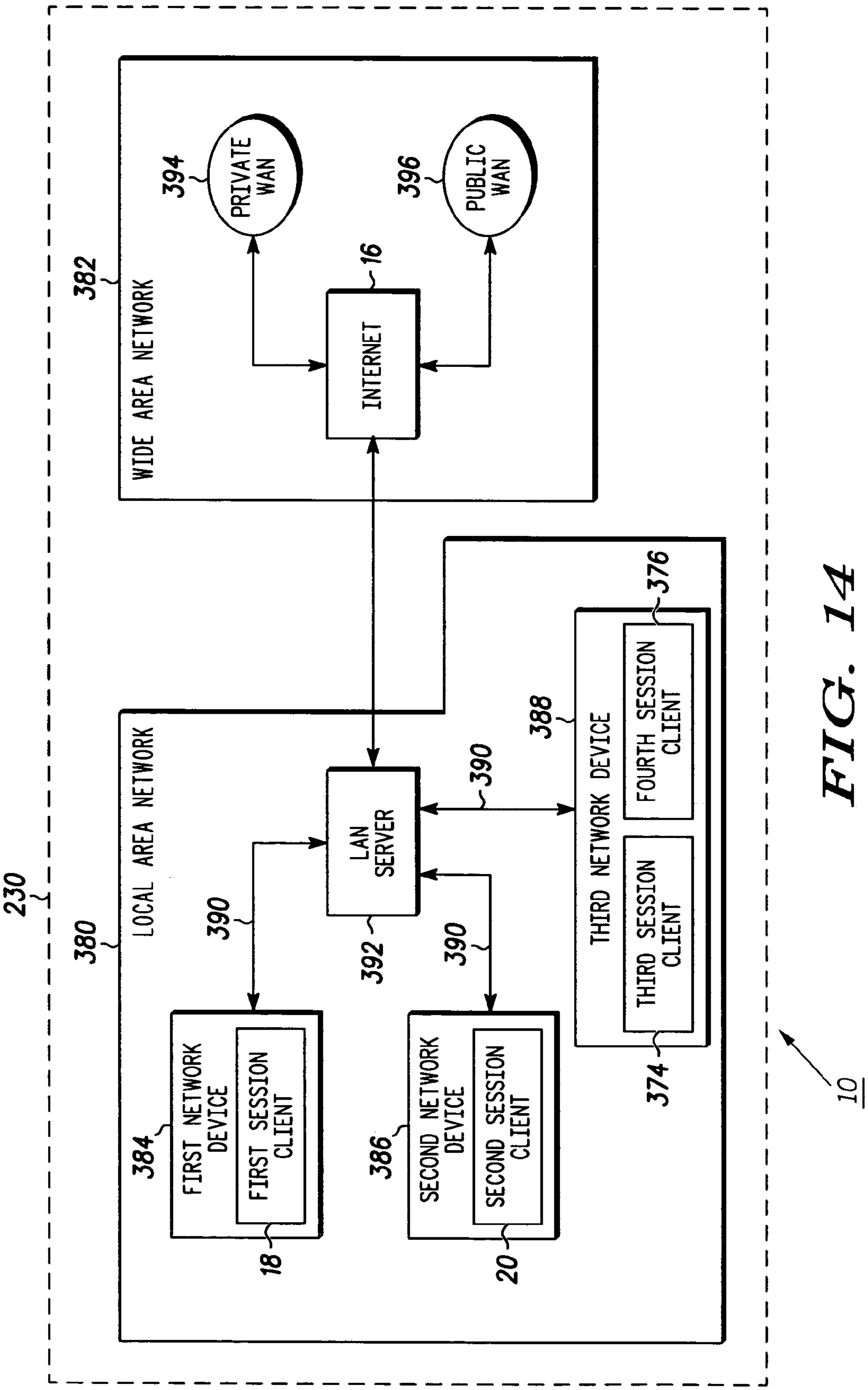

FIG. 14 is an electronic block diagram of one embodiment of the online communication system of FIG. 1. Specifically, FIG. 14 illustrates an embodiment of the present invention in which the online communication system 10 includes the wired communication system 230 of FIG. 10. The wired communication system 230, for example, can include a LAN 380 (local area network), a WAN 382 (wide area network), or a combination of LAN 380 and WAN 382 networks. It will be appreciated that while only a single LAN 380 and a single WAN 382 are shown, multiple LAN 380 networks and/or WAN 382 networks can be interconnected in a manner well known to one of ordinary skill in the art for the transfer of electronic communication, such as electronic mail (email) and real time electronic messaging (i.e., instant messaging and chat messaging), including the plurality of session entries 140 and other of the plurality of client data 46.

The general function and operation of the LAN 380 is one of allowing spatially co-located computers, which are typically located within a room, building or campus of buildings, to communicate with each other and/or share common resources on a computer network in a manner well known to one of ordinary skill in the art. The spatially co-located computers are represented pictorially in FIG. 14 as a plurality of network devices, such as the fixed network device 196 of FIG. 10, three of which are shown by example (e.g., a first network device 384, a second network device 386, and a third network device 388). Each of the plurality of network devices communicates using a network connection 390. Preferably, at least one session client operates within a network device. For example, as illustrated in FIG. 14, the first session client 18 operates within the first network device 384 and the second session client 20 operates within the second network device 386. Similarly, a plurality of session clients can operate within the same network device. For example, the third session client 374 and the fourth session client 376 operate within the third network device 388. It will be appreciated by one of ordinary skill in the art that, in accordance with the present invention, a network device can include no session client, one session client, or a plurality of session clients.

Typical resources shared on the LAN 380 through a LAN server 392 are files on a file server, printers on a print server, electronic message (email) services on an email server, and Internet connection services on an Internet server. The LAN 380 uses a physical network, such as ARCNET, Ethernet, Token-ring, Local Talk or other network media, to connect the computers, which represent wired network nodes into the network. The LAN 380 can employ any one of a number of networking protocols, such as TCP/IP (Transmission Control Protocol/Internet Protocol), AppleTalk™, IPX/SPX (Inter-Packet Exchange/Sequential Packet Exchange), Net BIOS (Network Basic Input Output System) or any other packet structures, to enable the communication between clients and the server. In the following description, the term "local area network" or "LAN" refers to a network utilizing any of the networking protocols mentioned above or an equivalent. The LAN 380 can also use routers (not shown) to subnet the LAN 380 organizationally or physically. In this context, the definition of the LAN 380, as described herein, refers to a geographic locality of computers and the type of wired media used to interconnect the computers for communication.

The general function and operation of the WAN 382 is also one of allowing computers to share common resources. However, in this context the definition used herein is one where the computers are not spatially co-located. The typical resources shared are similar to, if not the same, as found in the LAN 380. However, the WAN 382 uses a different physical network media, such as X.25, Frame Relay, ISDN, Modem dial-up or other media, to connect other computers or other local area networks to the WAN 382 network. The WAN 382, for example, can include a number of well-known private wide area networks (one (394) of which is shown by example) and public wide area networks (one (396) of which is show by example), such as CompuServe™, America Online™ (AOL), the MIT computer network, the Motorola™ computer network and Prodigy™. In the following description, the term "wide area network" refers to any of the networks mentioned above or an equivalent. The WAN 382 described above can operate independently or can be interconnected through the Internet computer network 16. Likewise, the LAN 380 can also be interconnected to the WAN 382 through the Internet computer network 16, as shown, in a manner well known to one of ordinary skill in the art.

Figure 15:
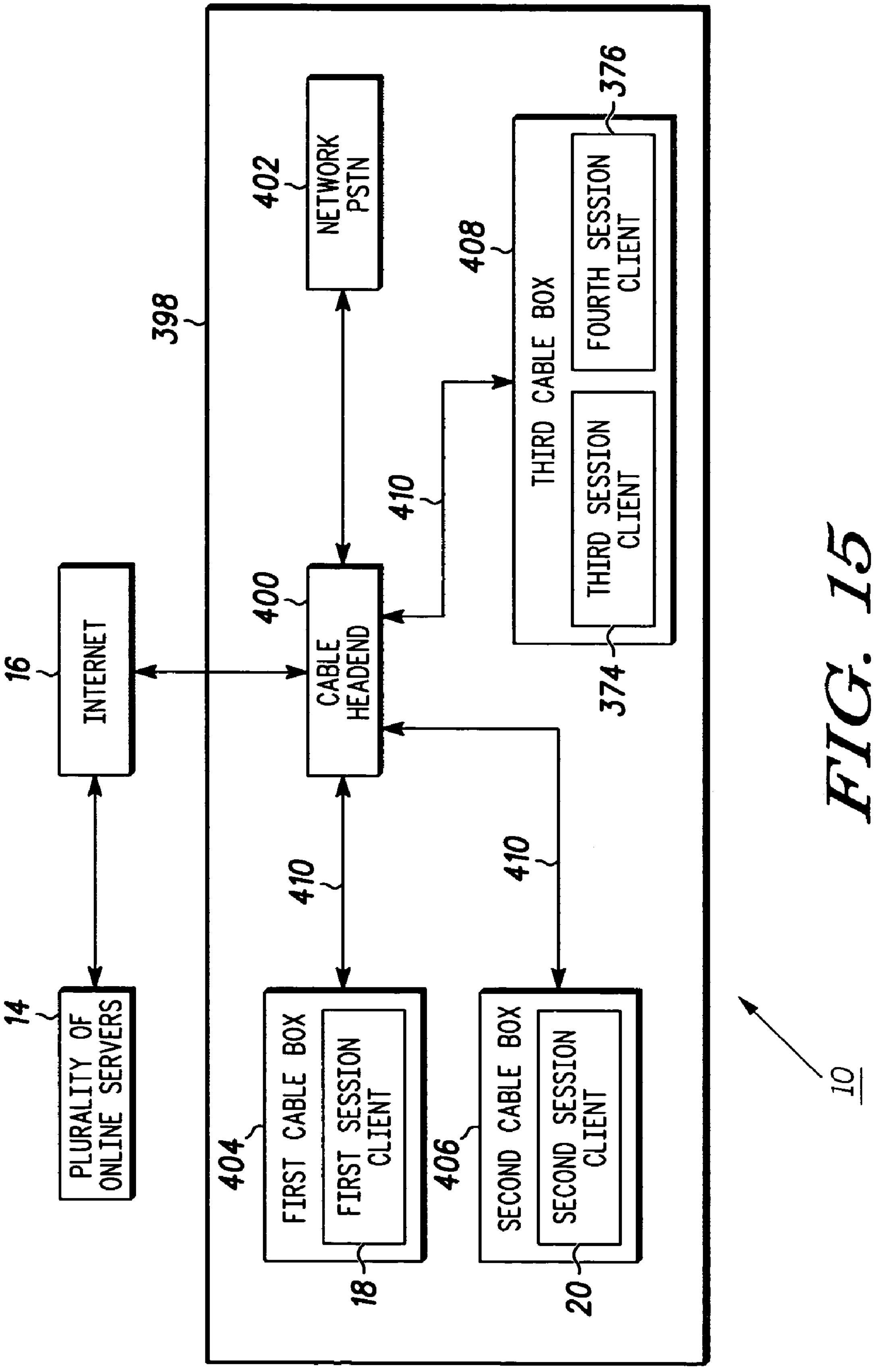

FIG. 15 is an electronic block diagram of one embodiment of the online communication system 10 of FIG. 1. Specifically, FIG. 15 illustrates an alternate embodiment of the present invention in which the online communication system 10 includes a broadcast communication system 398.

The broadcast communication system 398 preferably includes a cable headend 400, a network PSTN 402, and a plurality of cable boxes, such as the cable box 290 of FIG. 12, three of which are shown by way of example (e.g., a first cable box 404, a second cable box 406, and a third cable box 408). Each of the plurality of cable boxes communicates within the broadcast communication system 398 via a wired connection 410. Preferably, at least one session client operates within a cable box. For example, as illustrated in FIG. 15, the first session client 18 operates within the first cable box 404 and the second session client 20 operates within the second cable box 406. Similarly, a plurality of session clients can operate within the same cable box. For example, the third session client 374 and the fourth session client 376 operate within the third cable box 408. It will be appreciated by one of ordinary skill in the art that, in accordance with the present invention, a cable box can include no session client, one session client, or a plurality of session clients.

The cable headend 400 is coupled to the first cable box 404, the second cable box 406, the third cable box 408, the network PSTN 402, and, in one embodiment, the Internet computer network 16. The cable headend 400 enables operators to deliver services such as conventional video and audio broadcasting, near video on demand (NVOD), video on demand (VOD), pay television, advertising, information, interactive shopping and more. The cable headend 400 preferably offer functions such as MPEG-2/DVB (Moving Picture Experts Group-2/Digital Video Broadcasting) encoding of local and non-compressed programs, insertion of local advertising and events data insertion, conditional access (CA) scrambling, interactive services, and monitoring and control of the entire network. At the multiplexing stage, broadcasters can create program bouquets and add PSI/SI information (Program Specific Information (PSI)/specific information (SI)) before the outgoing transport stream is delivered to a conditional access (CA) system for scrambling. Following processing, transport streams are modulated and then transmitted to the cable headend 400 via telecom networks, terrestrial or satellite systems.

In one embodiment of the present invention, the Internet computer network 16 is coupled to the cable headend 400 of the broadcast communication system 398. The coupling of the cable headend 400 to the Internet computer network 16 provides a means for real time electronic communication between the cable boxes and the plurality of online servers 14.

Figure 16:
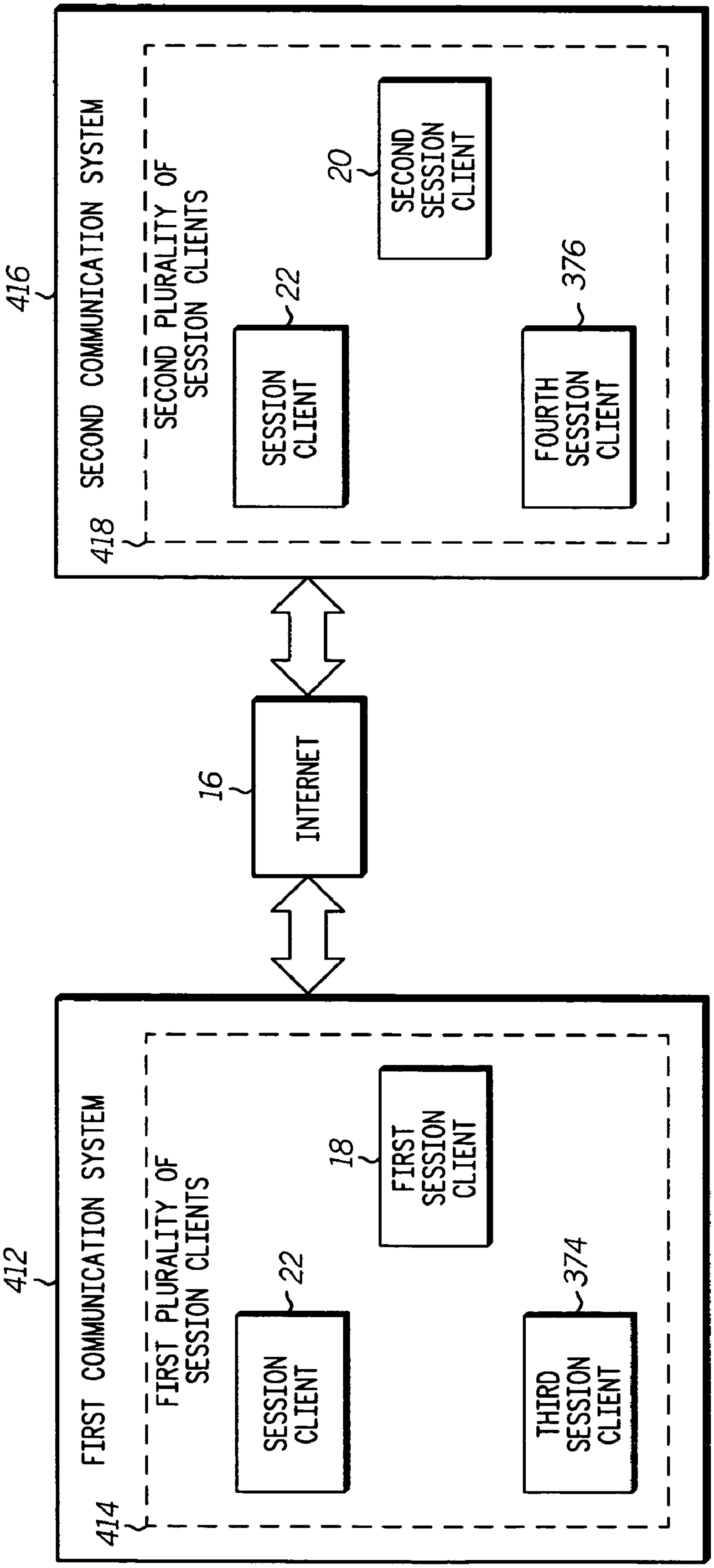

FIG. 16 is an electronic block diagram illustrating an alternative embodiment of the online communication system 10 in accordance with the present invention. As illustrated, the online communication system 10 preferably includes a first communication system 412 having a first plurality of session clients 414 and a second communication system 416 having a second plurality of session clients 418. Preferably, the first communication system 412 and the second communication system 416 are coupled to the Internet computer network 16. It will be appreciated by one of ordinary skill in the art that while only two communications systems are shown by way of example, multiple communication systems can be interconnected in a manner well known to one of ordinary skill in the art for the transfer of electronic information, such as the plurality of client data 46 and the plurality of session information 182, to the first plurality of session clients 414 and the second plurality of session clients 418.

It will be appreciated by one of ordinary skill in the art that, in accordance with the present invention, the first communication system 412 and the second communication system 416 can be the wireless communication system 276 of FIG. 13, the wired communication system 230 of FIG. 14, the broadcast communication system 398 of FIG. 15 or any other equivalent system. Further, in accordance with the present invention, the online communication system 10 can include a plurality of wireless communication systems, a plurality of wired communication systems, or any combination thereof. Similarly, each session client of the first plurality of session clients 414 and the second plurality of session clients 418 can operate within the mobile device 250 of FIG. 11, the fixed network device 196 of FIG. 10, or the cable box 290 of FIG. 12.

Figure 17:
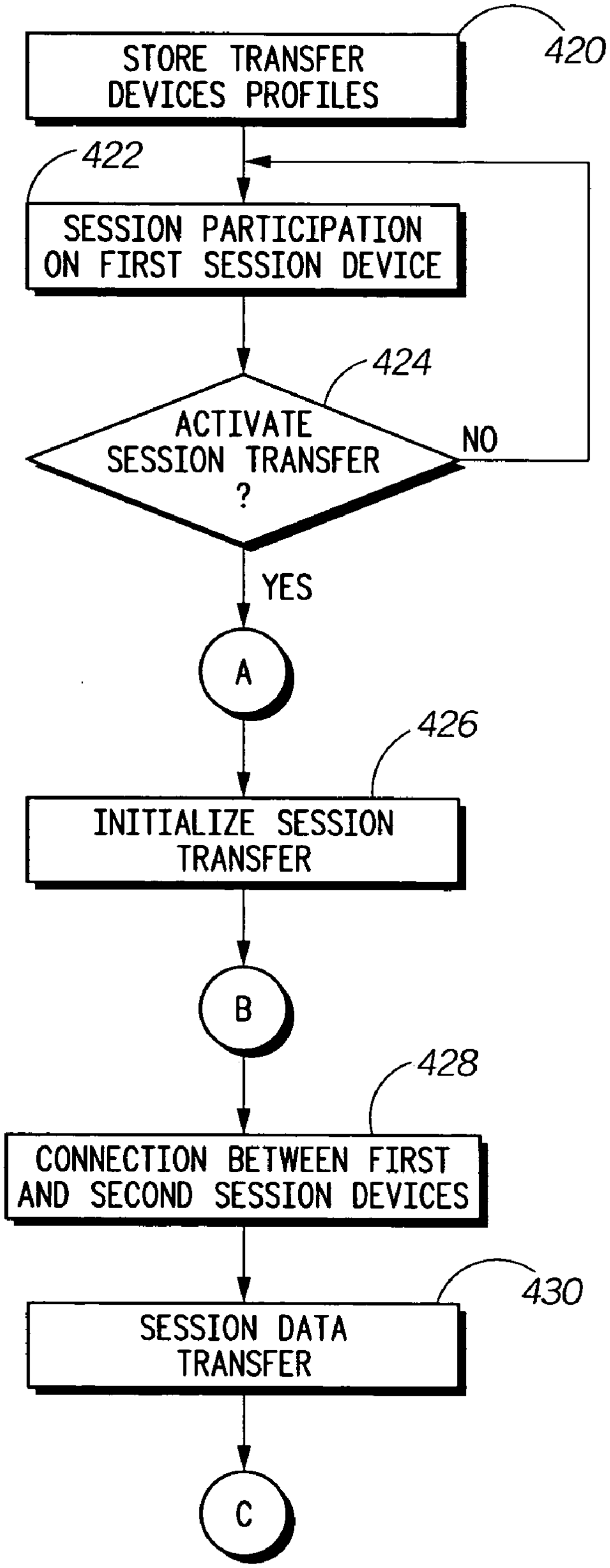
FIGS. 17 to 21 are flowcharts illustrating the operation of the online communication system of FIG. 1.

FIG. 17 is a flowchart illustrating the operation of the online communication system 10 in accordance with the preferred embodiment of the present invention. Beginning with Step 420, the transfer clients' profiles 156 for the current sessions 150 are stored in the first session client 18. The first session client 18, for example, can be operating on a first session device, such as the first mobile device 354 of FIG. 13, the first network device 384 of FIG. 14, the first cable box of FIG. 15, or an equivalent. Next, in Step 422, the first session device participates in one or more online sessions of the current sessions 150, such as the first current session 188, the second current session 194 or any other online session 80. For example, the online account user 64 can use the first session client 18 to participate in an online gambling event or an online auction event via one or more of the plurality of online servers 14. The first session client 18 operates using the first communication connection 32 and accumulates the plurality of session information 182 for each online session 80 for which the first session client 18 is participating.

Next, in Step 424, the process determines whether to activate a session transfer. A session transfer, in accordance with the present invention, is the capability for the online account user 64 to change session communication means within the online communication system 10 from the first session client 18 to the second session client 20. For example, when the online account user 64 establishes the first communication connection 32 using the fixed network device 196 and thereafter needs to become mobile, the online account user 64 can activate a transfer of the first client data 50, including the plurality of current session data 170 accumulated for the plurality of current sessions 150, to the second session client 20, which, for example, can operate on the mobile device 250. When no data transfer is required or requested in Step 424, the first communication connection 32 is maintained in Step 422, whereby the first session client 18 continues operating using the first communication connection 32 and accumulates the plurality of session information 182 for each online session 80 for which the first session client 18 is participating. In Step 426, when a session transfer is activated in Step 424, the session transfer is initialized.

Figure 18:
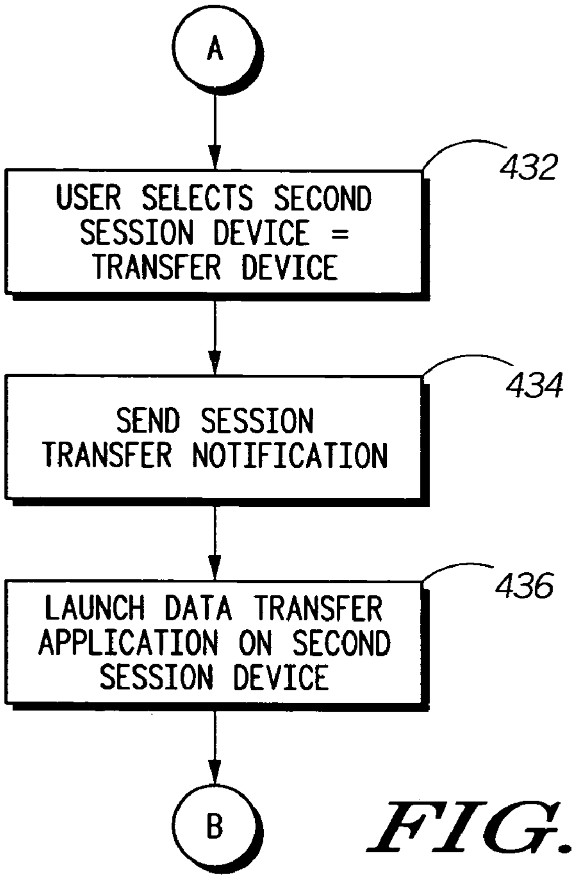

FIG. 18 is a flowchart illustrating one embodiment of the operation of the online communication system 10 at Step 426 of FIG. 17 in accordance with the present invention. Starting at node A, at step 432, the online account user 64 has decided to perform a session transfer from the first session client 18 to another session client of the plurality of session clients 12. For example, the online account user 64 can decide to perform a session transfer from the first session client 18 operating on the first network device 384 to another session device operating within the online communication system 10. In Step 432, the online account user 64 selects the second session client 20 from among the plurality of transfer clients' profiles 156 of the first session client 18 stored in Step 420 of FIG. 17 to which to transfer the first client data 50, including the plurality of current session data 170 accumulated for the plurality of current sessions 150.

Once the client profile 246 for a transfer device is selected from among the plurality of transfer clients' profiles 156 using the first session client 18 on the first session device, in Step 434 a session transfer notification is sent from the first session client 18. In one embodiment, the session transfer notification is sent from the first session client 18 to each online server 34 of the plurality of online servers 14 associated with each of the plurality of current sessions 150 informing the plurality of online servers 14 to pass the plurality of session information 182 for each of online session 80 to the chosen transfer session client. For example, a session transfer notification is sent to the online server 34 hosting an auction event including a request for the auction session data 98 to be sent to the second session client 20. Similarly, the session transfer notification can be sent to the online server 34 hosting a gambling event including a request for the gambling session data 118 to be sent to the second session client 20.

It will be appreciated by one of ordinary skill in the art that, alternatively, in accordance with the present invention, the session transfer notification can be sent directly to the second session client 20 from the first session client 18, sent through the plurality of online servers 14 to the second session client 20, or any combination therein. For example, in Step 432, the online account user 64 on the first session device in which the first session client 18 operates selects the desired transfer device. In step 434 the first session device sends the plurality of session information 182 for one or more online session 80 to the second session client 20 "through" the online server 34. During step 436, the second session client 20, upon reception of the plurality of session information 182, starts the second session client 20 on the second session device (receiving device) and begins a data transfer.

Next, in Step 436, the data transfer application 248 is launched on the second session device. It will be appreciated by one of ordinary skill in the art that the data transfer application 248 can be an individual application or alternatively incorporated within the second session client 20 operating on the second session device. The process then continues at node B.

In utilizing the approach illustrated in FIG. 18, the first session device can traverse the online server 34 that will provide a logical connection between the two session devices. An example is an instant messaging server that allows messaging information to be passed between two session devices. In this method, the second session device will have to have a username and a password to access the online server 34 while the first session device will be able to determine when the second session device becomes available either through presence information or a periodic polling of the second session device. In a preferred method, the session devices performing the transfer are easily addressable and do not require intervention by the online server 34 to carry out the transfer of the plurality of session information 182. It will be appreciated by one of ordinary skill in the art that IPv6 or an equivalent provides this capability.

Figure 19:
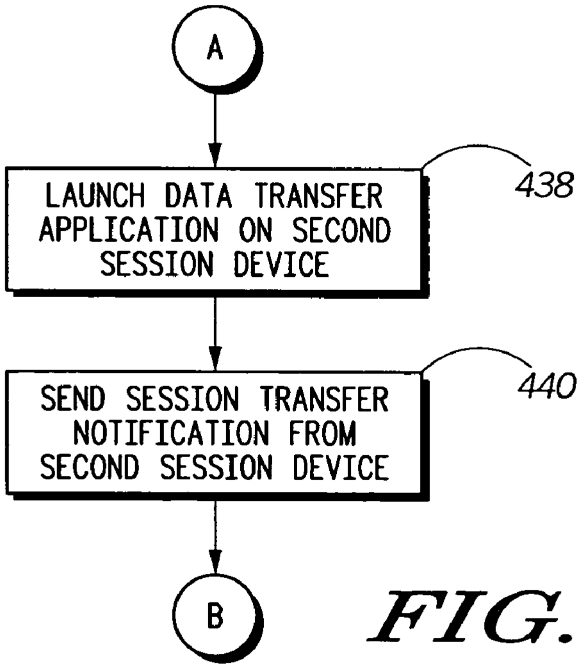

FIG. 19 is a flowchart illustrating an alternate embodiment of the operation of the online communication system 10 at Step 426 of FIG. 17 in accordance with the present invention. Beginning at node A, with Step 438, the data transfer application 248 is launched on the second session device. It will be appreciated by one of ordinary skill in the art that the data transfer application 248 can be an individual application or alternatively incorporated within the second session client 20 operating on the second session device. Next, in Step 440, the second session device, either via the data transfer application 248 or the second session client 20, sends the session transfer notification to the first session client 18. The session transfer notification preferably includes a request for the first session client 18 to transfer the first client data 50 including the plurality of current session data 170 accumulated for the plurality of current sessions 150 to the second session client 20. Further, in Step 440, the first session device, either via the first session client 18 or the data transfer application 248 of the first session device, receives the session transfer notification from the second session device. The process then continues at node B.

Referring back to FIG. 17, in Step 428, the first session device and the second session device create a communication connection. It will be appreciated by one of ordinary skill in the art that the communication connection can be made using the data transfer application 248 of each of the. first session device and the second session device, the first session client 18 and the second session client 20, or any combination thereof. The connection can be either directly from the first session device to the second session device or through the wide area network 382, the local area network 380, the Internet computer network 16, a short range wireless network (e.g.: IrDA (Infrared data association standard), Bluetooth, USB (Universal Ser. Bus), or Ser.), the wireless communication system 276, the wired communication system 230, the broadcast communication system 398, or any combination thereof. It will be appreciated by one of ordinary skill in the art that the connection can be any of the connections described herein or an equivalent. During the setup process of Step 428, both session devices can choose to authenticate and negotiate an encryption layer (not shown).

Next in Step 430, the session transfer is accomplished. In Step 430, the second session device is provided with the necessary content, including the plurality of current session data 170 accumulated for the plurality of current sessions 150, for the online account user 64 to continue with the plurality of current sessions 150 on the second session device. Depending upon how each online server 34 of the plurality of online servers 14 is configured, the transferable content can be as simple as a URL and a Cookie (updateable information maintained by the online server 34 on the session device) or can require additional information, such as the auction session data 98 for an auction event or the gambling session data 118 for a gambling event. Each online session 80 is transferred from the first session device to the second session device. It will be appreciated by one of ordinary skill in the art that, optionally, in Step 430, the two session devices can perform an authentication/verification process and negotiate an encryption method (not shown) using, for example, the authentication key 166. The process then continues at node C.

Figure 20:
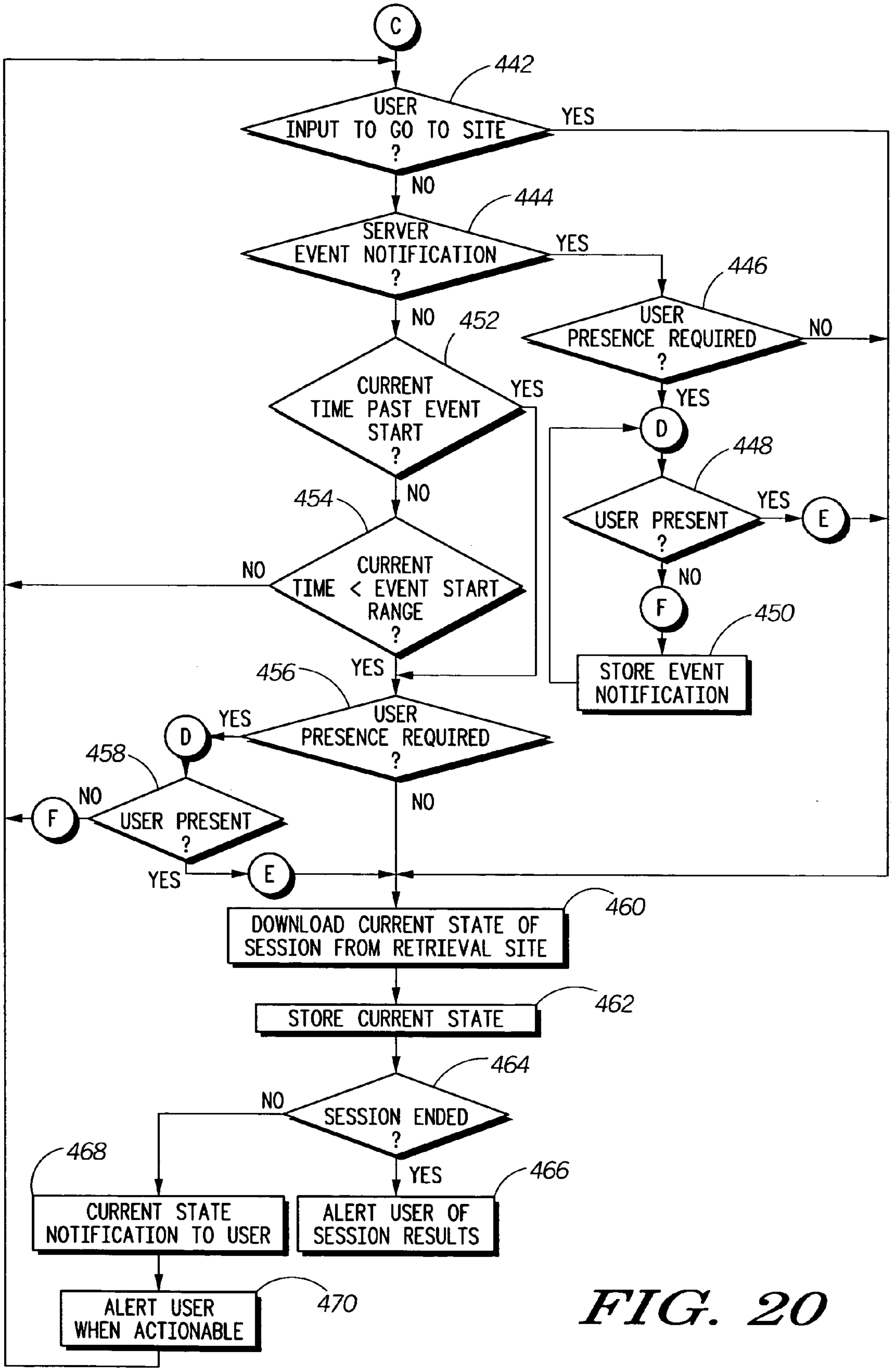

FIG. 20 is a flowchart illustrating the operation of the online communication system 10 in accordance with the preferred embodiment of the present invention. Beginning with node C, the second session device has received the plurality of session information 182 required to seamlessly continue the plurality of online sessions 150. At Step 442, the process determines whether an input by the online account user 64 has requested to go to an event site on the online server 34. Preferably, the event site is associated with at least one online session of the plurality of current sessions 150 in which the plurality of session information 182 was transferred to the second session device in Step 430 of FIG. 17. When a user input has been received, the process continues to Step 460.

When no user input has been received in Step 442, the process proceeds to Step 444 in which it is determined whether an asynchronous event notification has been received from the online server 34. Step 444 provides asynchronous external device event(s) to the session client 22 containing the online session application. For example, for an online auction session, the event can include a higher bidder, a time remaining, an auction result(s), and a new auction with a similar item. For an online gambling session, the event can include a change in odds, an updated score, a time remaining, a change in position of players or animals on the event field, late breaking news that would have a bearing on outcome, and a past session history performance. It will be appreciated by one of ordinary skill in the art that the event can be any of those mentioned herein or an equivalent. Similarly, in Step 444, an expiring of event parameters (not shown) internally to the device can be an alternative to the asynchronous event notification from the online server 34.

When a server event notification has been detected in Step 444, the process continues with Step 446 in which it is determined whether user presence is required. When user presence is not required in Step 446, the process continues to Step 460. When user presence is required in Step 446, at node D and Step 448, the process determines whether the online account user 64 is present. Preferably, the session client 22 determines if the online account user 64 is within close proximity of the session device and continues this process until the online account user 64 is within proximity of the session device. It will be appreciated by one of ordinary skill in the art that the user presence detection can be accomplished using several methods known in the art. For example, the session device can include one or more infrared sensor(s) for heat sensing and, using the output of one or more such sensors, determine if the online account user 64 is in the vicinity of the session device. Similarly, the session device can include an audible sensor that can listen for the online account user's voice pattern to determine relative proximity to the session device. Alternatively, the session device can use a proximity detector such as the detector described in U.S. Pat. No. 5,956,626, issued Sep. 21, 1999, and entitled "Wireless Communication Device having an Electromagnetic Wave Proximity Sensor" to Kaschke, et al., which patent is assigned to the assignee of the present invention and incorporated by reference herein. Alternatively, a detection device can be located on the online account user's body including a pairing between this detection device and the session device communicating via short-range connectivity. The short-range connectivity can be Bluetooth and utilize the service discovery process of Bluetooth to determine when the online account user 64 is within proximity of the session device.

When the presence of the online account user 64 is detected in Step 448, at node E, the process continues to Step 460. When the presence of the online account user 64 is not detected in Step 448, at node F and in Step 450, the session device stores the event notification information in memory for later use once the user presence is detected. For example, the session device stores the event notification information in the client data memory 284. The process thereafter continues with Step 448 and node D checking periodically for presence of the online account user 64.

Returning to Step 444, when no server event notification is detected, in Step 452, the session device determines if the current time has past the time of the event start. For example, when the session device is the fixed network device 196, the timing clock 198 sends the current time to the CPU 200, which then compares the current time to the time of the event. Similarly, when the session device is the mobile device 250, the clock 260 sends the current time to the processor 262, which then compares the current time to the time of the event.

When the current time has past the time of the event start, the process continues to Step 456. When the current time has not past the time of the event start, in Step 454, the session device determines whether the time of the event is within a specified range of the current time (note, one skilled in the art will recognize that it is common practice in software programming to check to see if a timer value is within a specified range—for example, the application would look for a range from 5 to 0 minutes before the event). For example, when the session device is the fixed network device 196, the timing clock 198 sends the current time to the CPU 200, which then compares the current time to the specified range of the time of the event. Similarly, when the session device is the mobile device 250, the clock 260 sends the current time to the processor 262, which then compares the current time to the specified range of the time of the event. When the time of the event is not within a specified range of time, the process cycles back to node C and Step 442. When the time of the event is within a specified range of time, the process continues at Step 456.

In Step 456, it is determined whether user presence is required. It will be appreciated that the method used in Step 456 can be substantially similar to the method used in Step 446 and herein described. When user presence is required in Step 456, the process determines whether the online account user 64 is present at node D and Step 458. It will be appreciated by one of ordinary skill in the art that the method used in Step 458 can be substantially similar to the method used in Step 448 and herein described. When user presence is not detected in Step 458, the process cycles back through node F to node C and Step 442.

Figure 21:
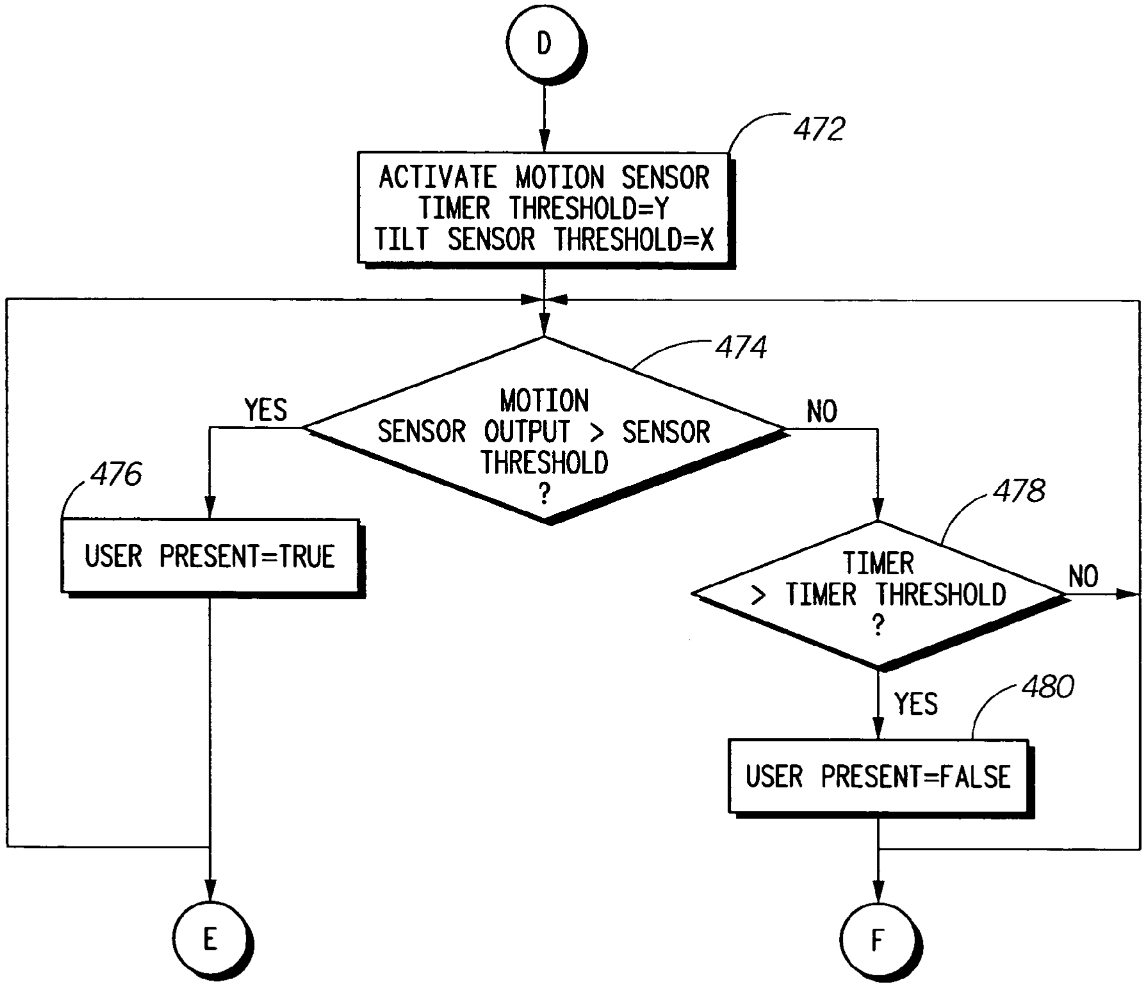

FIG. 21 is a flowchart illustrating more detail of the operation of the online communication system 10 at Steps 448 and 458 of FIG. 20 in accordance with the preferred embodiment of the present invention. Beginning at node D and Step 472, an initialization process is accomplished including activation of a motion sensor, setting of a timer threshold, and setting of a tilt sensor threshold. Next, in Step 474, it is determined whether the motion sensor output is greater than the tilt sensor threshold. In Step 476, when the motion sensor output is greater than the tilt sensor threshold, the online account user 64 is considered to be present and the process continues to node E. In Step 478, when the motion sensor output is not greater than the tilt sensor threshold, the timer output is compared to the timer threshold. When the timer is not greater than the timer threshold, the process returns to Step 474. In Step 480, when the timer is greater than the timer threshold in Step 478, the online account user 64 is not present and the process continues to node F. Upon completion of Step 480, the process can cycle back to Step 474 to continue periodically checking for the presence of the online account user 64.

Referring back to FIG. 20, when user presence is not required in Step 456, or user presence is required in Step 456 and user presence is detected in Step 458, the process continues to Step 460. In Step 460, the session client 22 utilizes the plurality of session information 182 and the session server identification 180 previously stored in the application folder area to retrieve the latest information on the event from the online session site and begins to process the information. It will be appreciated by one of ordinary skill in the art that, at Step 460, the session client 22 can retrieve the latest information on the event or based upon an event stimulus.

Next, in Step 462, the current state of the event retrieved from the event site is stored in the memory of the session device. For example, the current state of the event can be stored in the memory slot 286 for the online session 80 of the client data memory 284 of the session device. Next, in Step 464, the process determines whether the online session 80 has ended. In Step 466, when the online session 80 has ended, the session client 22 stores the results and other state information in the memory of the session device and alerts the online account user 64 of the session results. For example, the results and state information can be stored in the memory slot 286 for the online session 80 of the client data memory 284 of the session device. Types of state information that can be stored include the URL where results reside and the last URL visited. For an auction online session, the state information can include the auction item description/identification, the sale amount, similar items, and the sellers store front URL. For a gambling online session, the state information can include the type of event (e.g., football, racing or boxing) the score, prior history of related events (for example, who won the event the last time the same players met), and event odds. When the session has not ended in Step 464, the process continues to Step 468, wherein the online account user 64 is notified of the current state. Next, in Step 470, the online account user 64 is alerted preferably when the event is actionable. The process then cycles back to node C and Step 442.

Although the invention has been described in terms of preferred embodiments, it will be obvious to those skilled in the art that various alterations and modifications can be made without departing from the invention. Accordingly, it is intended that all such alterations and modifications be considered as within the spirit and scope of the invention as defined by the appended claims.

What is claimed is:

1. A method for providing continuity of at least one online session between a server and at least one remote session client, the method comprising:

participating in the at least one online session by a first session client, wherein participation by the first session client includes receiving and accumulating a plurality of session information for the at least one online session from the server;

initiating, by the first session client, a transfer of the plurality of session information for the at least one online session to a second session client operating within a session device so as to enable the second session client to seamlessly continue the at least one online session in place of the first session client after the transfer of the session information;

determining, by the second session client, whether a user is in close proximity to the session device without interaction with the session device by the user; and retrieving, by the second session client, latest information associated with the at least one online session when the user is determined to be in close proximity to the session device, wherein at least one of the first session client and the second session client operates within a mobile wireless device.

2. The method of claim 1, further comprising:

storing at least one transfer client profile associated with at least one of a plurality of session clients, wherein the initiating a transfer step includes choosing die second session client from the at least one stored transfer client profile.

3. The method of claim 1, wherein the at least one online session is an online gambling event, and further wherein the plurality of session information comprises one or a combination of information selected from a group consisting of: an event name, an event number, an event description, a navigational path, a gambling house, a start time, an end time, a number of gamblers, a current status, an event monitoring, a URL where results reside, a last URL visited, a type of event, a score, prior history of related events, and event odds.

4. The method of claim 1, wherein the at least one online session is an online auction session, and further wherein the plurality of session information comprises one or a combination of information selected from a group consisting of: an item name, an item number, an item description, an item identification, a navigational path, an auction type, an auction house, an end time, a number of bidders, a reserve price, a current status, a URL where results reside, and a store front URL for a seller.

5. The method of claim 1, wherein the initiating a transfer step further comprises:

sending a session transfer notification from the first session client.

6. The method of claim 5, wherein the session transfer notification is sent from the first session client to the server informing the server to pass the plurality of session information to the second session client.

7. The method of claim 5, wherein the session transfer notification is sent from the first session client directly to the second session client.

8. The method of claim 5, wherein the first session client operates within a first session device, wherein the second session client operates within a second session device, wherein at least one of the first session device and the second session device is the mobile wireless device, and wherein the session transfer notification is sent from the first session device to the second session device.

9. A method for providing continuity of at least one online session between a server and at least one remote session client the method comprising:

receiving, by a second session client operating within a session device, session information associated with at least one ongoing online session between a first session client and a server, the session information having originated from the first session client and the transfer of session information having been initiated by the first session client;

participating in the at least one online session by the second session client in place of the first session client to seamlessly continue the at least one online session after receipt of the session information from the first session client;

determining, by the second session client, whether a user is in close proximity to the session device without interaction with the session device by the user; and retrieving, by the second session client, latest information associated with the at least one online session when the user is determined to be in close proximity to the session device, wherein at least one of the first session client and the second session client operates within a mobile wireless device.

10. A method for providing continuity of at least one online session between a server and at least one remote session client the method comprising:

receiving, by a second session client operating within a session device, session information associated with at least one ongoing online session between a first session client and a server, the session information having originated from the first session client and the transfer of session information having been initiated by the first session client;

participating in the at least one online session by the second session client in place of the first session client to seamlessly continue the at least one online session after receipt of the session information from the first session client;

receiving, by the second session client, an asynchronous event notification from the server instructing the second session client to connect to an event site on the server associated with the at least one online session;

determining whether an online account user is in close proximity to the session device;

storing the asynchronous event notification when the online account user is determined not to be in close proximity to the session device;

periodically checking whether the online account user is in close proximity to the session device;

retrieving, by the second session client, latest information from the event site using the session information when the online account user is determined to be in close proximity to the session device; and storing the latest information retrieved from the event site, wherein at least one of the first session client and to second session client operates within a mobile wireless device.

11. The method of claim 9, further comprising:

retrieving, by the second session client, latest information from an event site on the server associated with the at least one online session using the session information after expiration of an event parameter of the session information; and storing the latest information retrieved from the event site.

12. The method of claim 9, further comprising: comparing a current time to a range surrounding an event time;

retrieving, by the second session client, latest information from an event site on the server associated with the at least one online session using the session information when the current time is within the range surrounding the event time; and storing the latest information retrieved from the event site.

13. The method of claim 9, wherein the step of receiving the session information comprises:

receiving the session information directly from the first session client.

14. The method of claim 9, further comprising:

receiving, by the second session client an asynchronous event notification from the server instructing the second session client to connect to an event site on the server associated with the at least one online session;

retrieving, by the second session client, latest information from the event site using the session information; and storing the latest information retrieved from the event site.

15. The method of claim 9, wherein the session device includes a motion sensor, and wherein the step of determining whether a user is in close proximity to the session device comprises:

determining whether an output of the motion sensor is greater than a tilt sensor threshold;

when the output of the motion sensor is greater than the tilt sensor threshold, determining that the user is in close proximity to the session device; and when the output of the motion sensor is not greater than the tilt sensor threshold and a predetermined time has expired, determining that the user is pot in close proximity to the session device.

16. An online communication system for providing continuity of at least one online session comprising:

at least one online server operable to host the at least one online session, wherein the at least one online session includes a plurality of session information;

a first session client operable to participate in the at least one online session, store the plurality of session information, and initiate a transfer of the plurality of session information therefrom; and a second session client operable within a session device to receive the plurality of session information from the first session client and to participate in the at least one online session in place of the first session client so as to seamlessly continue the at least one online session after the transfer of the session information, the second session client being further operable to determine whether a user is in close proximity to the session device without interaction with the session device by the user and retrieve latest information associated with the at least one online session when the user is determined to be in close proximity to the session device, wherein at least one of the first session client and the second session client operates within a mobile wireless device.

17. The online communication system of claim 16, wherein, the first session client operates within a first session device, wherein the second session client operates within a second session device, and wherein at least one of the first session device and the second session device is the mobile wireless device.

18. The online communication system of claim 17, wherein the first session device further comprises a memory for storing at least a transfer client profile associated with the second session device, and further wherein the first session client is operable to transfer the plurality of session information to the second session client using the transfer client profile.

19. The online communication system of claim 16, wherein the second session client is further operable to receive the plurality of session information directly from the first session client.

* * * * *